(12) United States Patent
Zielke et al.

(10) Patent No.: US 12,468,907 B2
(45) Date of Patent: *Nov. 11, 2025

(54) MODULAR MATERIAL TRACKING SYSTEM AND METHOD

(71) Applicant: Wire Pulse, Inc., Chicago, IL (US)

(72) Inventors: Jason Zielke, Lutherville-Timonium, MD (US); Eric Martin, Aurora, IL (US); Pete Wilson, Chicago, IL (US)

(73) Assignee: Wire Pulse, Inc., Chicago, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/524,913

(22) Filed: Nov. 30, 2023

(65) Prior Publication Data

US 2024/0386225 A1 Nov. 21, 2024

Related U.S. Application Data

(63) Continuation of application No. 17/124,904, filed on Dec. 17, 2020, now Pat. No. 11,886,951, and a continuation-in-part of application No. 16/397,883, filed on Apr. 29, 2019, now Pat. No. 11,745,975, which is a continuation-in-part of application No. 14/810,236, filed on Jul. 27, 2015, now Pat. No. 10,317,246.

(60) Provisional application No. 62/115,486, filed on Feb. 12, 2015, provisional application No. 62/029,934, filed on Jul. 28, 2014.

(51) Int. Cl.
*G01B 7/02* (2006.01)
*B65H 63/08* (2006.01)
*G06K 7/10* (2006.01)
*G06Q 10/087* (2023.01)
*H04Q 9/00* (2006.01)

(52) U.S. Cl.
CPC ......... *G06K 7/10366* (2013.01); *B65H 63/08* (2013.01); *G01B 7/026* (2013.01); *G06K 7/10297* (2013.01); *G06Q 10/087* (2013.01); *H04Q 9/00* (2013.01); *B65H 2511/114* (2013.01); *H04Q 2209/47* (2013.01)

(58) Field of Classification Search
CPC ............... B25H 63/08; G01B 7/026
USPC .......... 33/1 PT, 732, 733, 734, 735
See application file for complete search history.

(56) References Cited

U.S. PATENT DOCUMENTS 3,225,446 A * 12/1965 Sarfati .................. B65H 61/00
33/732
4,104,917 A * 8/1978 Rieth .................... D07B 1/147
374/170

(Continued)

*Primary Examiner* — George B Bennett
(74) *Attorney, Agent, or Firm* — Nyman IP LLC; Scott Nyman

(57) ABSTRACT

A modular material tracking system is provided for tracking material stored on and drawn from a reel using a modular system. The modular material tracking system may include a detection element, digital logic components, location receiver, enclosure, analytic components, interface component, sensor module, and plate module. One or more sensors relative to the reel may detect a position indicative of forward or reverse reel rotation. A processor may analyze signals to count rotations of the reel, which is savable in memory. A battery may provide power. The system may also record the time and location associated with rotations. A method for tracking material stored on and drawn from a reel using a modular material tracking system is also provided.

20 Claims, 15 Drawing Sheets

(56) References Cited

U.S. PATENT DOCUMENTS

| | | | | | |
|---|---|---|---|---|---|
| 4,447,955 | A | * | 5/1984 | Stutz | B65H 61/00 |
| | | | | | 702/97 |
| 5,395,065 | A | * | 3/1995 | Hirose | A01K 89/015 |
| | | | | | 242/223 |
| 5,988,556 | A | * | 11/1999 | Bednarczyk | B65H 54/70 |
| | | | | | 242/472.6 |
| 7,825,367 | B2 | * | 11/2010 | Nakamura | G01D 5/2448 |
| | | | | | 33/1 PT |
| 7,841,246 | B2 | * | 11/2010 | Swanson | B65H 61/00 |
| | | | | | 73/862.44 |
| 7,856,726 | B2 | * | 12/2010 | Davidson | G01D 5/244 |
| | | | | | 33/1 PT |
| 8,413,763 | B2 | * | 4/2013 | Hermann | A62B 3/00 |
| | | | | | 182/231 |
| 8,912,889 | B2 | * | 12/2014 | Sarchi | B66C 13/12 |
| | | | | | 340/572.1 |
| 10,317,246 | B2 | * | 6/2019 | Martin | G01D 5/3473 |
| 11,745,975 | B2 | * | 9/2023 | Martin | B65H 61/00 |
| | | | | | 242/563.2 |
| 11,886,951 | B2 | * | 1/2024 | Zielke | G01B 7/026 |

\* cited by examiner

MODULAR MATERIAL TRACKING SYSTEM AND METHOD

CROSS-REFERENCE TO RELATED APPLICATION

This application claims the priority from U.S. nonprovisional patent application Ser. No. 17/124,904 filed Dec. 17, 2020, U.S. nonprovisional patent application Ser. No. 16/397,883 filed Apr. 29, 2019, U.S. nonprovisional patent application Ser. No. 14/810,236 filed Jul. 27, 2015, U.S. provisional patent application Ser. No. 62/029,934 filed Jul. 28, 2014, and U.S. provisional patent application Ser. No. 62/115,486 filed Feb. 12, 2015. The foregoing applications are incorporated in their entirety herein by reference.

FIELD OF THE INVENTION

The present disclosure relates to a modular material tracking system. More particularly, the disclosure relates to tracking material stored on and drawn from a reel using a modular system.

BACKGROUND

Many materials used in construction or the fabrication of products (e.g., wire, cable, tubing, yarn, rope, etc.) are sold from the manufacturer on reels. Distributing materials on reels allows users (e.g., installers, contractors, manufacturers, etc.) to easily obtain a desired amount of the material for a job or task and enables easier storage and material control. A single reel of material is often used for multiple jobs. Many users manually track the usage of material from a reel while completing jobs. Some types of materials include a visual legend that is printed on the material at given intervals. Tracking the usage of material on reels is often necessary for inventory management, billing, and project planning. Manually tracking the usage of material from a reel requires a significant amount of time and expense and necessitates a system for recording material use. In addition, manual tracking is subject to significant inaccuracies caused by human error. These inaccuracies contribute to waste and increase project cost.

A variety of material tracking systems have been previously developed for materials that are distributed from a reel. Some are generally of the type that attaches directly to the material, independent of the reel and tracks the movement of the line as it feeds from its container. Taymer International, Inc. (Markham, Ontario, CA) is one example of a distributer of measuring devices that are directly attached to the material being distributed. These devices are typically only used in the manufacture of cable because they use a system of complex rollers to measure the material as it is spooled out, which makes this solution expensive and prone to potential errors. This technical approach also requires recalibration of the devices for different material diameter.

Other material tracking systems are used in reel-to-reel audio tape monitoring, as exemplified in U.S. Pat. No. 5,808,824 to Kaniwa, et al. These systems combine reel to reel tape speed measurements with winding radius calculations to control tape feed through a complex series of measuring devices that are integrated with the machine that reads the tape. The system requires complex sensors on both reels along with calculations that feed back into the controlling device and require complex manufacturing and assembly. They are permanent components of the machinery and are not used to track inventory. In this system, the device uses a ratio between the tension of the tape and the torque output of the reel motors to calculate the radius of an empty take-up spool and then ultimately by tracking the tape fed calculations may be made to ultimately determine the radius of the working radius of the supply spool and the length of the fed tape.

Measurement of wire bonding loops is done in semiconductor fabrication as electronic wire is attached to various components as exemplified in U.S. Pat. No. 8,301,841 to Qin. These systems simply calibrate wire payout based on the timing of a payout mechanism and are not used to measure remaining length. They do not measure rotational variables from a spool, reel, or other wire container.

U.S. Pat. No. 6,921,044 to Graber et al shows a device for storing and detecting the end of a wire as it is unspooled. The device uses the few wraps of wire closest to the drum to block the magnetic lines of flux from reaching the magnetic sensor mounted outside of the spool. As the last few wraps of wire no longer block the magnetic flux the sensor will momentarily pick up that flux once per rotation. If the sensor is hooked to an output source (e.g., Light, siren etc.) the output source will energize once per rotation informing the user that the wire is about to run out. Among other potential shortcomings, this device does not provide any advanced warning that the wire will be running out, let alone, provide any inventory management capabilities.

In the fishing gear industry, attempts have been made to develop sensor-based systems to track the amount of fishing line let out from a fishing reel. For example, U.S. Pat. No. 4,790,492 to Takashi provides for magnet-based sensor system for measuring and providing the length of fishing line paid out or reeled in. This unitary system teaches one-to-one correspondence between sensor sub-system, processor, and display. As such, among other potential shortcomings, the approach disclosed by the '492 Takashi patent is too expensive for use in simultaneously tracking multiple reels of material.

Therefore, a need exists to solve the deficiencies present in the prior art. What is needed is a system with a detection component to track and relay the length of material on a reel or spool. What is needed is a tracking system to accurately determine material removed from a reel. What is needed is a sensor module and plate module to provide efficient and flexible monitoring of material removed from a reel or spool. What is needed is a system to aid in selection of a reel for a deployment job. What is needed is a system to centralize information relating to material on various reels. What is needed is a method of tracking material stored on and paid out from one or more reel. What is needed is a method of sensing use characteristics of a reel of material.

SUMMARY

An aspect of the disclosure advantageously provides a system with a detection component to track and relay the length of material on a reel or spool. An aspect of the disclosure advantageously provides a tracking system to accurately determine material removed from a reel. An aspect of the disclosure advantageously provides a sensor module and plate module to provide efficient and flexible monitoring of material removed from a reel or spool. An aspect of the disclosure advantageously provides a system to aid in selection of a reel for a deployment job. An aspect of the disclosure advantageously provides a system to centralize information relating to material on various reels. An aspect of the disclosure advantageously provides a method of tracking material stored on and paid out from one or more reel. An aspect of the disclosure advantageously provides a method of sensing use characteristics of a reel of material.

According to an embodiment of this disclosure, a system may be provided for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges. The system may include a plate module to be physically installed to the reel. In some embodiments, the plate module may include a reel identification index to identify the reel. The system may include a sensor module removably installed to the plate module. The sensor module may include a sensor to produce a signal indicative of rotation of the reel. The sensor module may include a sensor module processor operably receiving the signal from the sensor and counting cumulative rotations of the reel. The sensor module may include a sensor module memory operably associated with the sensor module processor for storing memory contents including the cumulative rotations of the reel. The sensor module may include a radio frequency transmitter to communicate at least part of the sensor module memory contents. The sensor module may include a sensor module battery that may power at least the sensor module processor, the sensor module memory, the sensor, and the radio frequency transmitter. A remaining length of the material wound on the reel may be calculated based on at least the cumulative rotations of the reel.

In another aspect, the system may include a docking interface, which may further include a plate docking interface provided by the plate module, and a sensor docking interface provided by the sensor module. The sensor docking interface may be removably received by the plate docking interface to provide a docked physical connection. The docked physical connection may be selectively disengaged to remove the sensor docking interface from the plate docking interface.

In another aspect, the system may include an electronic interface, which may further include a plate module electronic interface, and a sensor module electronic interface. The docked physical connection may align the plate module electronic interface and the sensor module electronic interface to create a docked electronic connection. Electronic signals may be selectively communicated via the electronic interface in the docked electronic connection.

In another aspect, the plate module may be at least partially powered by the sensor module battery. In some embodiments, without limitation, the plate module may be at least partially charged by the sensor module battery via the electronic interface.

In another aspect, the reel identification index may be communicated from the plate module to the sensor module in via the electronic interface.

In another aspect, the sensor module may retrieve a length value for the length of the material included by the reel identified by the reel identification index. The sensor module may determine the cumulative rotations of the reel occurring subsequent to retrieving the length value. The sensor module may analyze the cumulative rotations to determine the length of the material drawn from the reel. The sensor module may update the length value identified by the reel identification index to reflect the length of the material remaining on the reel after at least part of the material is drawn from the reel.

In another aspect, global memory may be provided that may be accessible over a network via the radio frequency transmitter to communicate at least the reel identification index and the length value. One or more length values may be associated with respectively one or more corresponding reels and stored by the global memory. At least part of the one or more length values stored by the global memory may be displayed to a user via an interface.

In another aspect, the sensor module may further include a clock that outputs time values. The sensor module memory may store time series data indicative of the cumulative rotations of the reel correlated with the time values.

In another aspect, the sensor module may further include a sensor location receiver that outputs a geographic position. The sensor module may associate an event in which the material is drawn from the reel with the geographic position at which the material is drawn. The sensor module may store the geographic position associated with the event in the sensor module memory.

In another aspect, the sensor module may include a sensor location receiver that may output a geographic position and a clock that may output time values. The sensor module memory may store time series data indicative of the cumulative rotations of the reel correlated with time values. The sensor module may associate the time series data indicative of an event in which the material removed from the reel with the geographic position at which the event occurred. The sensor module processor may further store the time series data indicative of the geographic position associated with event in the sensor module memory.

In another aspect, the sensor may detect angular orientation.

In another aspect, the rotations of the reel may be determined using a change in the angular orientation sensed by the sensor.

In another aspect, the sensor may include an accelerometer.

According to an embodiment of this disclosure, a system may be provided for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges. The system may include a plate module, a sensor module, a docking interface, and an electronic interface. The plate module may be physically installed to the reel. In some embodiments, the plate module may include a reel identification index to identify the reel.

The sensor module may be removably installed to the plate module. The sensor module may include a sensor to detect change in angular orientation and produce a signal indicative of rotation of the reel. The sensor module may include a sensor module processor operably receiving the signal from the sensor and counting cumulative rotations of the reel. The sensor module may include a sensor module memory operably associated with the sensor module processor for storing memory contents including the cumulative rotations of the reel. The sensor module may include a sensor module battery powering at least the sensor module processor, the sensor module memory, and the sensor.

The docking interface may include a plate docking interface provided by the plate module, and a sensor docking interface provided by the sensor module. The sensor docking interface may be removably received by the plate docking interface to provide a docked physical connection. The docked physical connection may be selectively disengaged to remove the sensor docking interface from the plate docking interface.

The electronic interface may include a plate module electronic interface and a sensor module electronic interface. The docked physical connection may align the plate module electronic interface and the sensor module electronic interface to create a docked electronic connection. Electronic signals may be selectively communicated via the electronic interface in the docked electronic connection. The reel identification index may be communicated from the plate module to the sensor module via the electronic interface. A remaining length of the material wound on the reel may be calculated based on at least the cumulative rotations of the reel, which may be a difference between forward rotations and reverse rotations.

The sensor module may retrieve a length value for the length of the material included by the reel identified by the reel identification index. The sensor module may determine the cumulative rotations of the reel occurring subsequent to retrieving the length value. The sensor module may analyze the cumulative rotations to determine the length of the material drawn from the reel. The sensor module may update the length value identified by the reel identification index to reflect the length of the material remaining on the reel after at least part of the material is drawn from the reel.

In another aspect, a global memory may be accessible over a network via radio frequency transmitter to communicate at least the reel identification index and the length value. One or more length values associated with respectively one or more corresponding reels may be stored by the global memory. At least part of the one or more length values stored by the global memory may be displayed to a user via an interface.

In another aspect, the sensor module may include a clock that may output time values. The sensor module memory may store time series data indicative of the cumulative rotations of the reel correlated with the time values.

In another aspect, the sensor module may include a sensor location receiver that may output a geographic position. The sensor module may associate an event in which the material is drawn from the reel with the geographic position at which the material is drawn. The sensor module may store the geographic position associated with the event in the sensor module memory.

According to an embodiment of this disclosure, a method may be provided for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges.

The method may include a) physically installing a plate module to the reel, the plate module. In some embodiments, the plate module may include a reel identification index to identify the reel. The method may include a) removably installing a sensor module to the plate module that may be physically installed to the reel. The method may include b) producing a signal indicative of rotation of the reel using a sensor included by the sensor module. The method may include c) counting cumulative rotations of the reel via the sensor processor using at least the signal. The method may include d) storing memory contents comprising the cumulative rotations of the reel to a sensor module memory operably associated with the sensor module processor. The method may include e) calculating a remaining length of the material wound on the reel based on at least the cumulative rotations of the reel. A sensor module battery selectively may power at least the sensor module processor, the sensor module memory, and the sensor.

In another aspect, the method may include f) providing a docked physical connection via receiving a sensor docking interface by a plate docking interface to provide a docked physical connection to provide a docking interface. The docked physical connection may be selectively disengaged to remove the sensor docking interface from the plate docking interface. The method may include g) aligning a plate module electronic interface and a sensor module electronic interface to create an electronic interface. Electronic signals may be selectively communicated via the electronic interface.

In another aspect, the method may include h) retrieving a length value via the sensor module for the length of the material included by the reel identified by the reel identification index. The method may include i) determining via the sensor module the cumulative rotations of the reel occurring subsequent to retrieving the length value. The method may include j) analyzing via the sensor module the cumulative rotations to determine the length of the material drawn from the reel. The method may include k) updating via the sensor module the length value identified by the reel identification index to reflect the length of the material remaining on the reel after at least part of the material is drawn from the reel.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
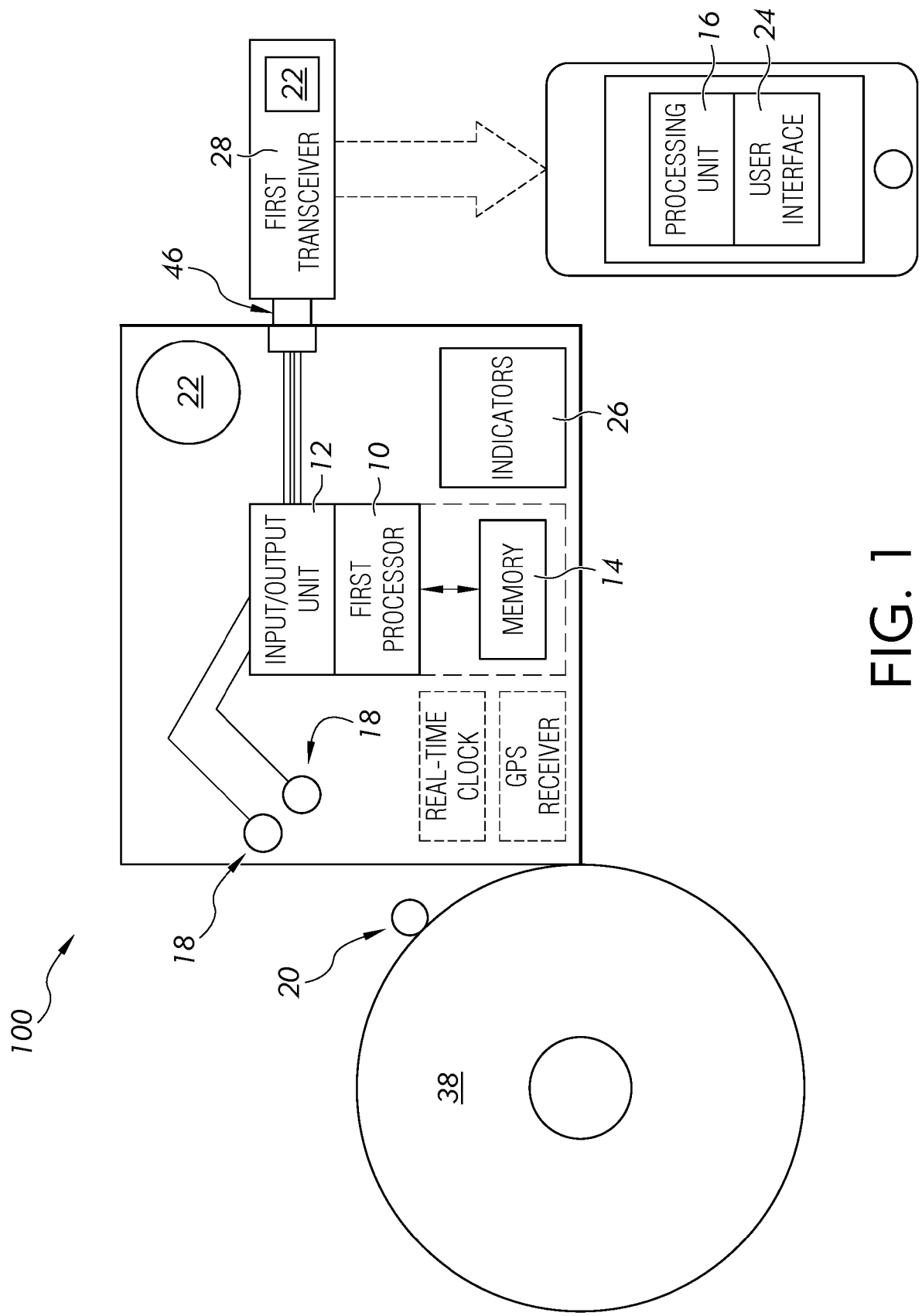
FIG. 1 is a block diagram view of a material tracking system, according to an embodiment of this disclosure.

The following disclosure is provided to describe various embodiments of a modular material tracking system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The terms pay off and payout, as used throughout this disclosure, is defined as to allow a cable, rope, or flexible material to be run off a reel, spool, or drum. The term reel, as it is used throughout this disclosure, is defined as a revolvable device upon which something flexible is wound. The term sensor module, as it is used throughout this disclosure, is defined as a modular component including a sensor and communication electronics. The term plate module, as it is used throughout this disclosure, is defined as a modular component optionally including electronic components to receive a sensor module.

Also, terminology used throughout this disclosure is for the purpose of description and should not be regarded as limiting. The use of "including," "comprising" or "having" and variations are inclusive sets and may include additional items. The terms "mounted," "connected" and "coupled" are used broadly and encompass both direct and indirect mounting, connecting, and coupling. Furthermore, "connected" and "coupled" are not restricted to physical or mechanical connections or couplings, and can include electrical connections or couplings, whether direct or indirect. The term "set" is used broadly to refer to one or more. Also, electronic communications and notifications may be performed using direct connections, wireless connections, and other connections that will be appreciated by those of skill in the art. The use of the term "reel" is used broadly and encompasses a cylinder, frame, or other device that turns on an axis and is used to wind up or pay out a material and can include a spool, a bobbin, and/or a roller (which may collectively be referred to as a "core"). The term "material" includes a product of any length having a thickness (e.g., width-depth or diameter) that can be wound onto a spool and distributed by unwinding the reel. Examples of materials include, but are not limited to, bare metal wire, metal wire that contains a covering, flexible pipe, rope, yarn, thread, fabric, metal cable, coaxial cable, fiber optic cable, paper, tape, cellophane, plastic filament, 3D printing material, and the like.

Various aspects of the present disclosure will now be described in detail, without limitation. In the following disclosure, a modular material tracking system will be discussed. Those of skill in the art will appreciate alternative labeling of the modular material tracking system as a material tracking system, spool measuring device, reel sensing and measuring apparatus, pay off sensor and calculator, material management system, the invention, or other similar names. Similarly, those of skill in the art will appreciate alternative labeling of the modular material tracking system as a material pay off sensing operation, reel tracking method, payout monitoring and management operation, material data analytic and inventory management technique, method, operation, the invention, or other similar names. Skilled readers should not view the inclusion of any alternative labels as limiting in any way.

It should also be noted that various hardware and software-based devices, as well as various structural components may be utilized to implement the invention. Furthermore, and as described in subsequent paragraphs, the specific configurations illustrated in the drawings are provided as examples and embodiments of the invention. Alternative configurations are possible.

Referring now to FIGS. 1-27, the modular material tracking system will now be discussed in more detail. The material tracking system may include a material, reel, detection element, digital logic components, battery and power components, transceiver and communication components, location receiver, enclosure, analytic components including one or more processor, interface component, and additional components that will be discussed in greater detail below. The material tracking system may operate one or more of these components interactively with other components to track material stored on and drawn from a reel.

The modular material tracking system may also include a sensor module, plate module, and additional components that will be discussed in greater detail below. The modular material tracking system may operate one or more of these components interactively with other components for tracking material stored on and drawn from a reel using a modular system.

An invention enabled by this disclosure relates to tracking the usage of materials from a reel using a material tracking system. FIG. 1 demonstrates a basic configuration of a material tracking system enabled by this disclosure. The system may include, among other components, a first processor 10 that may contain an input/output (I/O) unit 12, a memory 14 (which may be integral to the first processor 10), and a processing unit (CPU) 16, at least one sensor 18, optionally a detection element 20, one or more power supply modules (e.g., a coin-type or LiPo battery cells) 22, one or more indicators 26, and one or more communications modules, including a first transceiver 28. The indicators 26 may, for example, include one of more LEDs and/or a liquid crystal display ("LCD"). In one implementation, the controller 10 may be associated with a single printed circuit board ("PCB") that is populated with one or more of electrical and electronic components that provide power, operational control, and protection to the material tracking system. The memory 14 may include, for example, a read-only memory ("ROM"), a random-access memory ("RAM"), an electrically erasable programmable read-only memory ("EEPROM"), or other flash memory. Memory 14 may store information regarding the rotation of the reel. For example, the memory 14 may contain the total number of forward rotations of the reel. In an embodiment including a real-time clock and/or a location receiver, for example a GPS receiver, the memory may also save time/date and/or locations in association with the reel rotational data. Finally, the memory may also store an identification number that is unique to the reel/material to allow a business to track the material remaining on one or more of reels substantially simultaneously.

The controller or first processor 10 may be operably connected via first transceiver 28 to an external device (e.g., a computer, a smart phone, a tablet), which may include a processing unit 16 and user interface 24 (i.e., combinations of software and hardware that are operable to among other things, calculate the amount of material currently on a reel and activate the one or more indicators 26 or communicate with the one or more external devices). The processing unit 16 may be connected to a memory on the external device and may execute software that is capable of being stored in the RAM (e.g., during execution), the ROM (e.g., on a generally permanent basis), or another non-transitory computer readable medium such as another memory or a disc.

Software included in some embodiments of the material tracking system may be stored in the memory operably associated with the processing unit. The software may include, for example, firmware, one or more applications, program data, one or more program modules, and other executable instructions. The processing unit may be configured to retrieve from memory and execute instructions related to the control processes and methods described below, including for example, the instructions for performing calculations necessary to determine the current amount of material on the reel 30 (see FIG. 2).

The PCB may also include, among other components, one or more of additional passive and active components such as resistors, capacitors, inductors, integrated circuits, and amplifiers. These components may be arranged and connected to provide one or more of electrical functions to the PCB including, among other things, filtering, signal conditioning, or voltage regulation. For descriptive purposes, the PCB and the electrical components populated on the PCB are collectively referred to as the battery-powered measurement sub-system 100 (which may also be known as the counting chip). Furthermore, in some embodiments, the PCB includes means for affixing the sub-system 100 to a reel or a reel box. The means for affixing the system can be permanent or removable. In some embodiments, the PCB includes a cover or housing which is affixed to the PCB. The cover or housing can be permanent or, more preferably, removable. Where the reel or reel box is exposed to the elements, the housing can be waterproof or can contain a gasket or seal to prevent water, dust, or other contaminants from reaching the PCB circuitry.

The user interface 24 may be included to control the material tracking system. The user interface may be operably coupled to the first processor 10 to receive or input, for example, physical parameters of a given reel 30 and/or the material stored on the reel for use in tracking usage of the material. Although shown as being associated with a smartphone that uses soft keys, the user interface 24 may include any combination of digital and analog input devices required to achieve a desired level of control for the system. For example, the user interface 24 can be comprised of a computer having a display and input devices, a touch-screen display, one or more of knobs, dials, switches, buttons, faders, and/or the like.

The power supply module 22 may supply nominal voltages to the material tracking system. The power supply module 22 may include one or more batteries or battery packs, and more preferably by one or more rechargeable batteries or battery packs. The power supply modules 22 may also be configured to supply lower voltages to operate circuits and components within the material tracking system.

The communication module 28 may send and/or receive signals to and/or from one or more separate communication modules. Signals may include, among other components, information, data, serial data, and data packets. The communication module 28 may be coupled to one or more separate communication modules via wires, fiber, and/or wirelessly. Communication via wires and/or fiber can be virtually any appropriate network topology known to those skilled in the art, such as Ethernet. Wireless communication can be any appropriate wireless network topology known to those skilled in the art, such as Wi-Fi, Bluetooth, LTE, Zig-Bee, etc.

In some embodiments, the communications module 28 is configured to receive an input. The input is for example, a streaming input of data values, a data packet, a set of data, etc. The input includes, among other information, an input identifier (e.g., identification number, reel identification index, etc.) for a reel, one or more of physical parameters for a reel (e.g., reel width, reel core volume, etc.), an input identifier (e.g., identification number) for a type of material, data from a sensor 20, and one or more of physical parameters for a type of material (e.g., material length, material outer diameter, etc.). After the input has been received, the input may be transmitted or transferred to the processing unit 16. In another embodiment, at least some processing may be done locally on a processor locally and operatively connected to the sensor, without limitation. In some embodiments, the processing unit is configured to retrieve, from the memory, one or more of parameters for a type of material based at least in part on a received input identifier for a type of material. In other embodiments, the processing unit is configured to retrieve, from memory, one or more of parameters for a reel based at least in part on a received input identifier for a reel.

Figure 2:
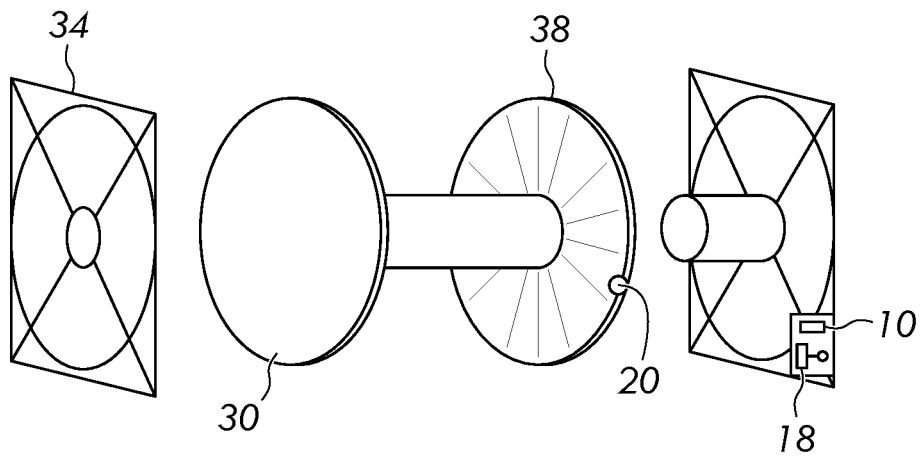
FIG. 2 is a schematic view of a reel in association with a battery-powered measurement sub-system that measures reel rotation and stores associated data, according to an embodiment of this disclosure.

Now turning to FIG. 2, which shows a common configuration of a reel 30, according to an embodiment of this disclosure. In this embodiment, the end cap 34 can be removable or integrated permanently into the reel 30. The detection element 20 and/or plate module may be coupled to the reel 30 and can be removable or permanently attached. In some embodiments, the detection element 20 is coupled to the outer edge of one of the flanges 38 of the reel 30. The battery-powered measurement sub-system 100 containing first processor 10 and sensors 18 are attached to the end cap 34 and is placed in such a position to track the rotation of the detection element 20.

Figure 3:
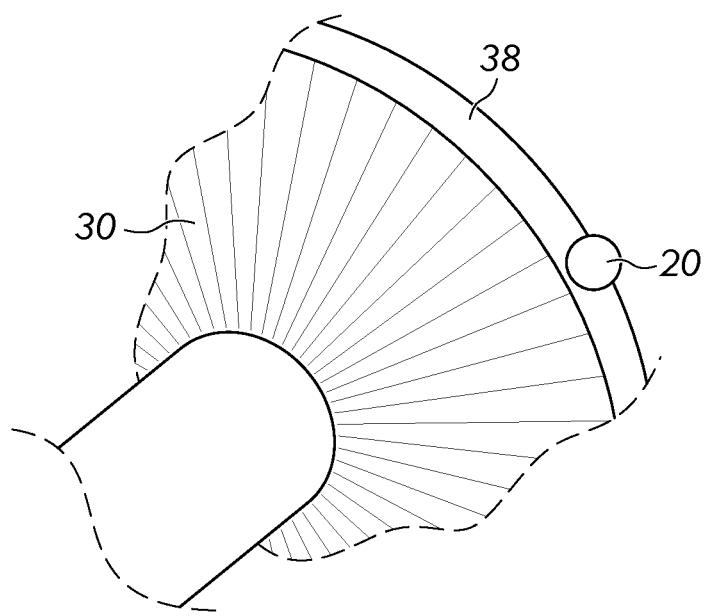
FIG. 3 is an enlarged schematic detailed view of a flange of a reel showing one embodiment of the placement of a detection element, according to an embodiment of this disclosure.

In FIG. 3, a close-up view of a flange 38 of a reel 30 is shown. A detection element 20 and/or plate module is shown attached to the outer edge of the flange 38.

When material is removed from or added to the reel, the reel rotates, which causes the detection element 20 to rotate. In this embodiment, the sensor 18 may transmit a signal each time it detects the proximity of the detection element 20 (e.g., every time the detection element 20 passes the sensor 18). In some embodiments, the signals indicate the current direction of rotation of the reel (e.g., clockwise, counterclockwise). In one embodiment, sensors 18 are magnetic sensors. In alternate embodiments, sensor 18 may be a different type of sensor including, for example, a capacitive sensor, a laser sensor, an optical sensor, an infrared sensor, a touch sensor, accelerometers, etc. In some embodiments, the material tracking system includes one or more of sensors that are spaced apart. Each sensor 18 in the one or more sensors may transmit a signal when the detection element passes. In one embodiment, the detection element 20 may be a type of magnet (e.g., neodymium). In alternate embodiments, the detection element 20 is any type of element appropriate for the type of sensor used in the system.

The first processor 10 may be configured to receive signals from the sensor(s) 18. Upon receiving the signals, the controller 10 may determine whether the reel 30 has rotated in a first direction (e.g., clockwise) or in a second direction (e.g., counterclockwise). In some embodiments, the first processor/controller 10 may receive a separate signal from each sensor 18 in one or more of sensors and determine the rotation direction of the reel 30 based on the order in which the signals are received. For example, the controller 10 may determine that the reel 30 is rotating in a first direction when a signal from a first sensor 18 $a$ is received before a signal from a second sensor 18 $b$, and the controller may determine that the reel 30 is rotating in a second direction when the signal from the second sensor 18 $b$ is received before the signal from the first sensor 18 $a$.

The processing unit 16 may be configured to determine a new or updated value for the amount (e.g., length) of material on the reel 30. In some embodiments, the controller 10 may determine the new amount of material on the reel 30 using the following equations:

$$x_{New} = x_{CURRENT} - 2\pi\sqrt{\frac{\left(\left(L*\pi*\left(\frac{d}{2}\right)^2 + n\right)/w\right)}{\pi}}.$$ Equation 1

$$x_{New} = x_{CURRENT} + 2\pi\sqrt{\frac{\left(\left(L*\pi*\left(\frac{d}{2}\right)^2 + n\right)/w\right)}{\pi}}.$$ Equation 2

Wherein:
L=starting length of the material on the reel in inches
d=diameter of the material on the reel in inches
n=volume of the core of the reel in cubic inches
w=width of the reel (i.e., distance between the flanges) in inches
xCURRENT=the current value for the length of the material on the reel in inches, and
xNEW=the new value for the length of the material on the reel in inches In this embodiment, the processing unit 16 may use equation 1 when the reel 30 has rotated in the first direction (i.e., material has been removed from the reel 30). The processing unit 16 uses equation 2 when the reel 30 has rotated in the second direction (i.e., material has been added to the reel 30). Use of inches as the unit of measurement in Equations 1 and 2 are provided for exemplary purposes and any commonly used length unit (e.g., feet, yards, meters, centimeters, etc.) or any fraction thereof can be used, without limitation. In some embodiments, the above-described parameters of the reel 30 and material are retrieved from the memory. In other embodiments, the above-described parameters of the reel 30 and material are received via the communication module 28.

After calculating a new or updated value for the amount of material on the reel 30 the processing unit may transmit an output. The output is for example, a streaming output of data values, a data packet, a set of data, etc. The output can include, among other things, an identifier (e.g., identification number or reel identification index) of the reel 30 an identifier (e.g., identification number) of the material, and/or the current value for the amount of material on the reel 30. This value can be, for example, in any commonly used linear measurement with inches being one embodiment.

Figure 4:
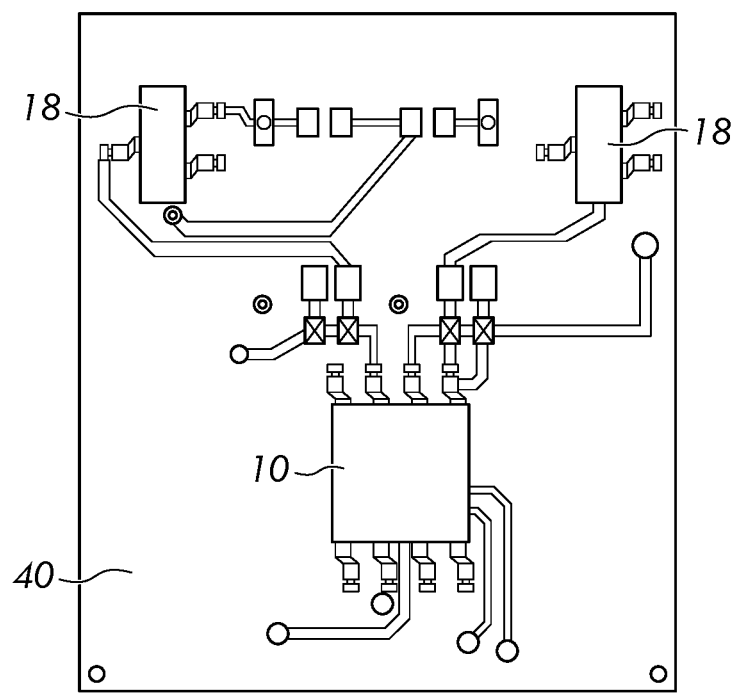
FIG. 4 is a schematic front view of an embodiment of a first side of a first PCB of the material tracking system, according to an embodiment of this disclosure.

FIG. 4 shows one embodiment of a first side 40 of a first PCB. In some embodiments, a first side 40 of the first PCB includes, among other components, a first controller 10 and a pair of sensors 18. In some embodiments, the first controller 10, among other operations, receives signals from the pair of sensors 18 as they track the detection element, transmits signals to a second controller of a second PCB, and performs the material tracking operations described above.

Figure 5:
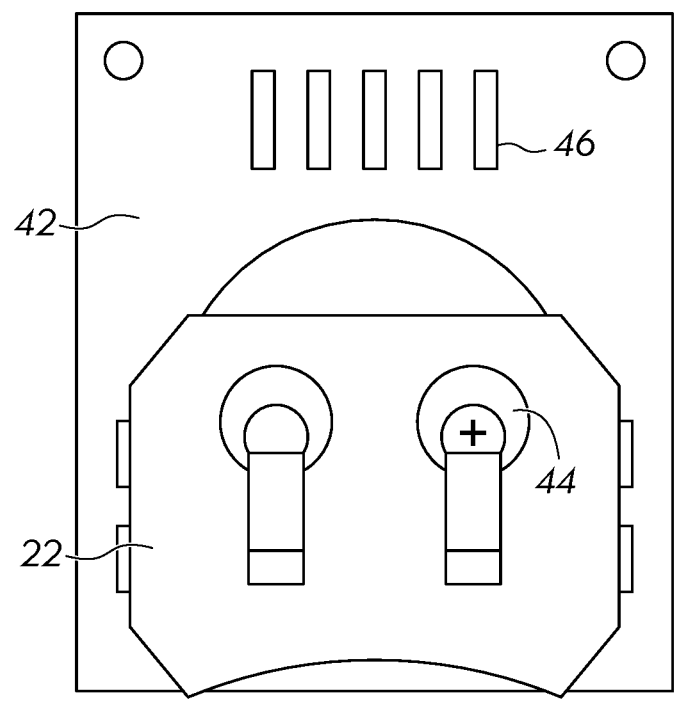
FIG. 5 is a schematic front view of an embodiment of a second side of a first PCB of the material tracking system, according to an embodiment of this disclosure.

In some embodiments, a second side 42 of the first PCB includes, among other components, a power supply module 22 containing a pair of batteries 44 and a connector 46, as illustrated in FIG. 5. The connector 46 can be any type of standard connector for a PCB, including solid pads, pins, or holes. In one embodiment, solid pads are used as the connector 46. In some embodiments, the first PCB is coupled to a second PCB via the connector 46. In some embodiments, the first PCB is coupled to the end cap 34 during packaging of the material on the reel 30. In some embodiments, the first PCB is disposable.

Figure 6:
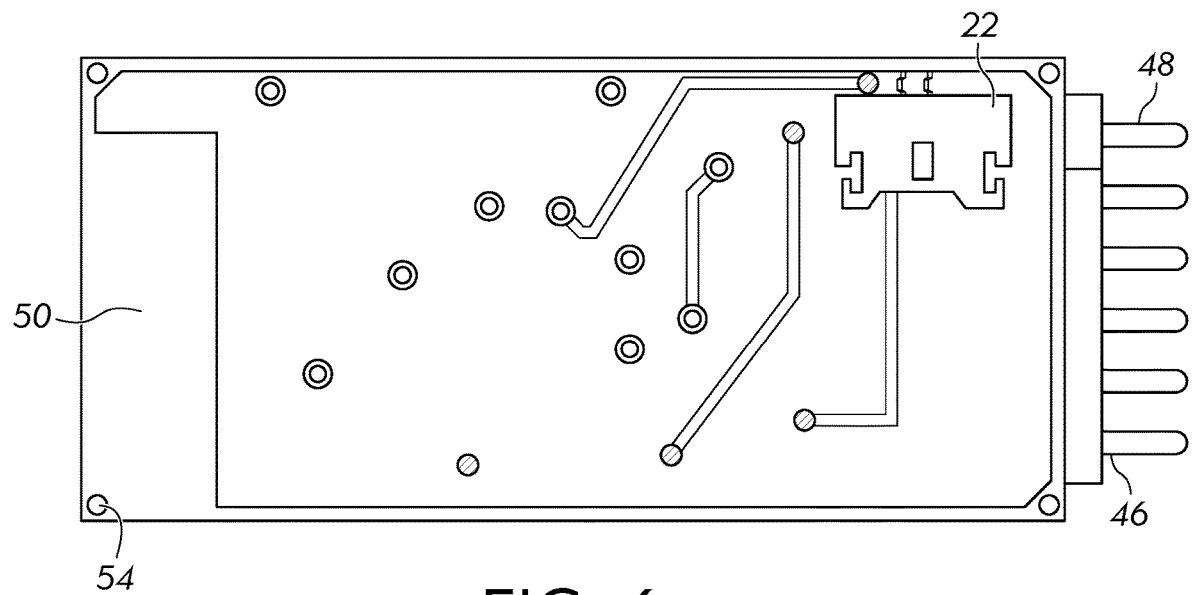
FIG. 6 is a schematic front view of an alternative embodiment of a first side of a first PCB of the material tracking system, according to an embodiment of this disclosure.

FIG. 6 shows one embodiment of a first side 50 of a second PCB. In some embodiments, a first side 50 of the second PCB includes, among other components, a power supply module 22 and a connector 46. In some embodiments, the power supply module 22 is a rechargeable battery and thus requires a dedicated power connection 48 included with the connector 46. In other embodiments, the battery may be permanent or factory replaceable.

Figure 7:
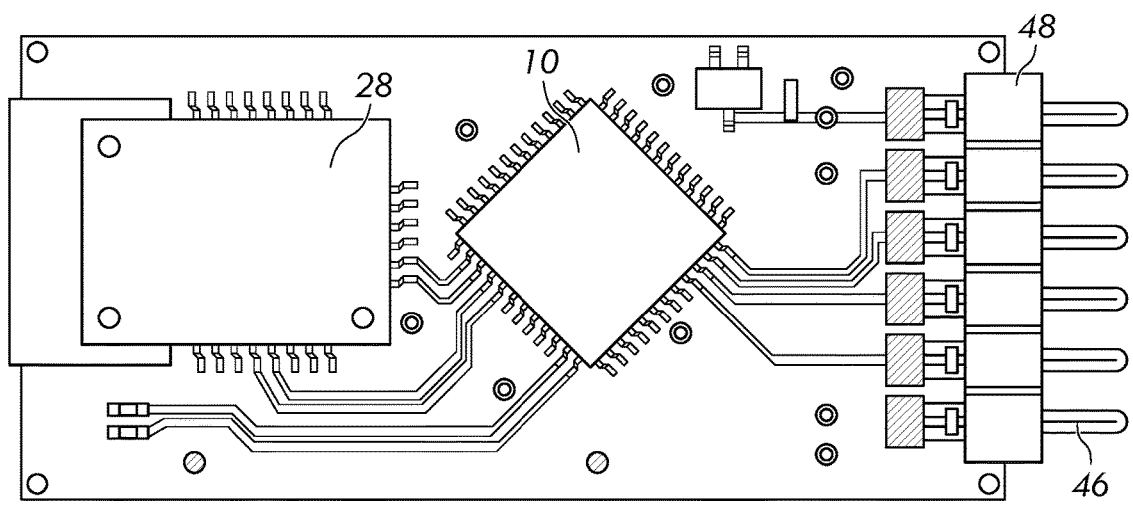
FIG. 7 is a schematic front view of an alternative embodiment of a second side of a first PCB of the material tracking system, according to an embodiment of this disclosure.

FIG. 7 shows a second side 60 of a second PCB. In some embodiments, the second side contains a second controller 10, a communication module 28 and a connector 46. The connector 46 can be any type of standard connector for a PCB, including solid pads, pins, or holes. For exemplary purposes, pins are shown in FIGS. 6 and 7. A dedicated power connection 48 for recharging the battery is included in the connector 46. In a preferred embodiment, the communication module 28 is a wireless transceiver (e.g., Bluetooth BTLE, Kirkland, Wash.). In some embodiments, the first PCB is coupled to a second PCB via the connector 46. In one embodiment, the connector 46 of the second PCB may link directly to the connector of the first PCB. In some embodiments, the connector 46 of the second PCB may link to the first PCB via wires. In some embodiments, the first PCB is coupled to the end cap 34 during packaging of the material on the reel 30. In some embodiments, the second PCB (i.e., first transceiver 28) is removable and can be used on multiple first PCBs (i.e., battery-powered measurement sub-system 100). In some embodiments, the first PCB 100 may be disposable.

Figure 8:
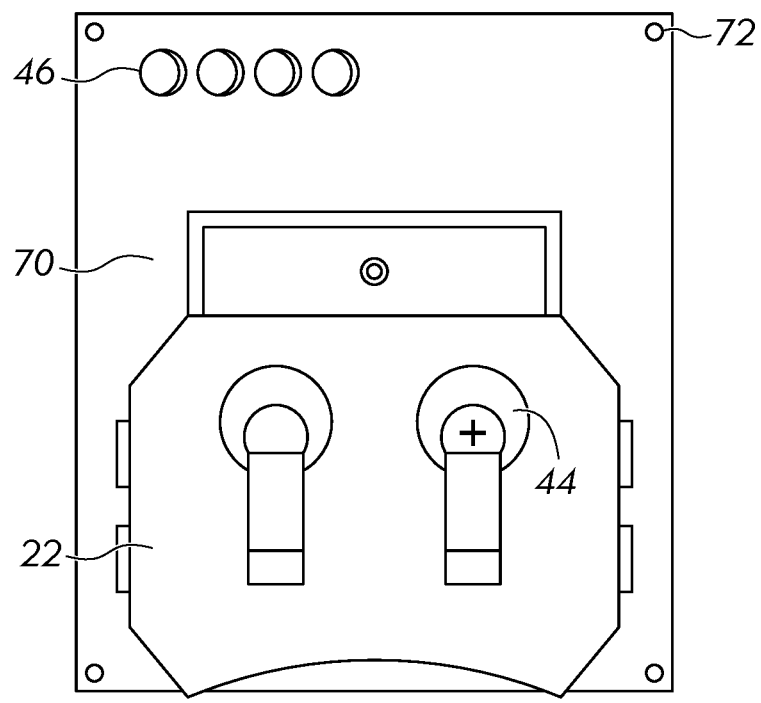
FIG. 8 is a schematic front view of an embodiment of a first side of a second PCB of the material tracking system, according to an embodiment of this disclosure.

FIG. 8 shows an alternate embodiment of a first side 70 of a first PCB. In some embodiments, a first side 70 of the first PCB includes, among other components, a power supply 22 and a connector 46. In some embodiments, the power supply module 22 is a pair of batteries 44. In this example, the connector 46 comprises one or more of holes for pin connections. In one embodiment the PCB has a series of openings 72 to affix the PCB to an end cap. Standard affixing means such as screws, nails or the like can be used in the openings 72 to secure the PCB onto the end cap.

Figure 9:
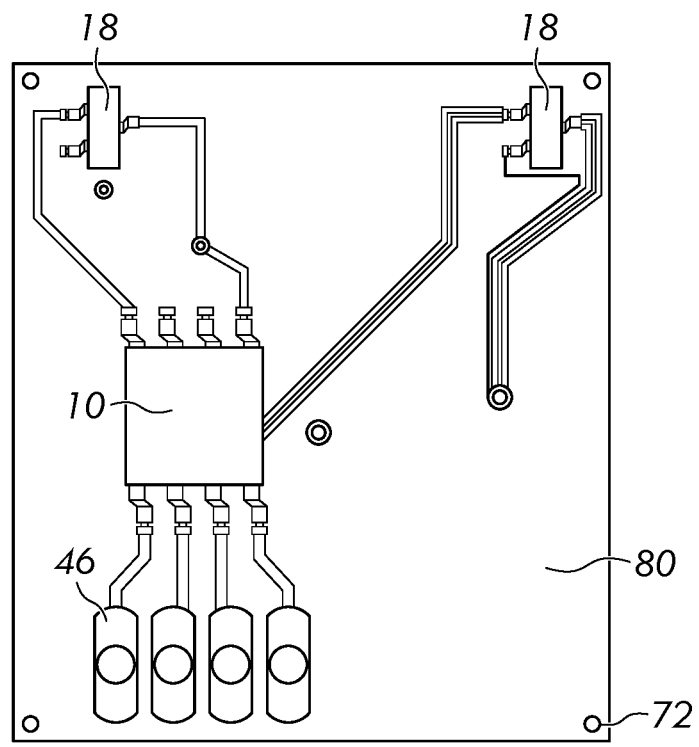
FIG. 9 is a schematic front view of an embodiment of a second side of a second PCB of the material tracking system, according to an embodiment of this disclosure.

FIG. 9 shows an alternate embodiment of a second side 80 of a first PCB. In some embodiments, the second side 80 of the first PCB includes, among other components, a first controller 10, a pair of sensors 18 and a connector 46. The connector 46 can be any type of standard connector for a PCB, including solid pads, holes, or pins. In this embodiment, the connector 46 comprises one or more of holes, among other components. In one embodiment the PCB has a series of openings 72 to affix the PCB to an end cap. Standard affixing means such as screws or nails or the like can be used in the openings 72 to secure the PCB onto the end cap.

Figure 10:
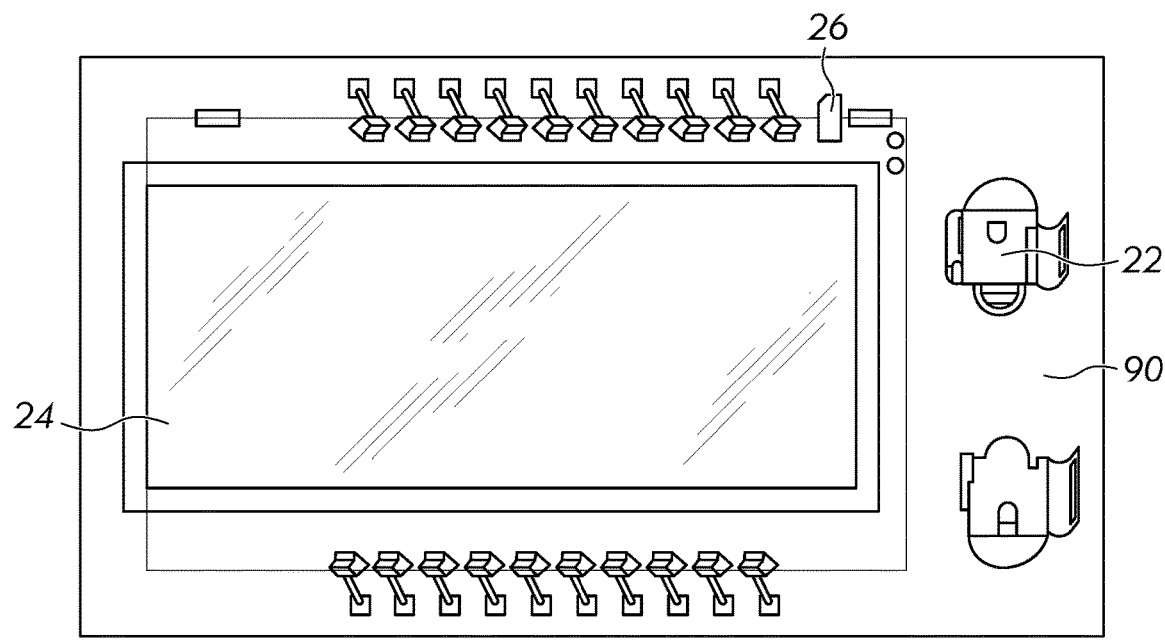
FIG. 10 is a schematic front view of an alternate embodiment of a first side of a second PCB of the material tracking system, according to an embodiment of this disclosure.

FIG. 10 shows an alternate embodiment of a first side 90 of a second PCB. This PCB may include, among other components, a user interface 24, an indicator 26, and a power supply module 22. In some embodiments, the user interface 24 is an LCD screen which displays a number that represents the current amount of material on the reel, in approximately real time. In some embodiments, the user interface 24 displays information about the nature of the material and the reel that has been input by a user from a mobile computing platform such as a smart phone, tablet, and/or computer. In some embodiments, the indicator 26 is an LED which activates or deactivates based on the amount of material on the reel. For example, the LED activates when less than 10% of the original amount of material is left on the reel. In some embodiments, the power supply module 22 holds a battery (not shown).

Figure 11:
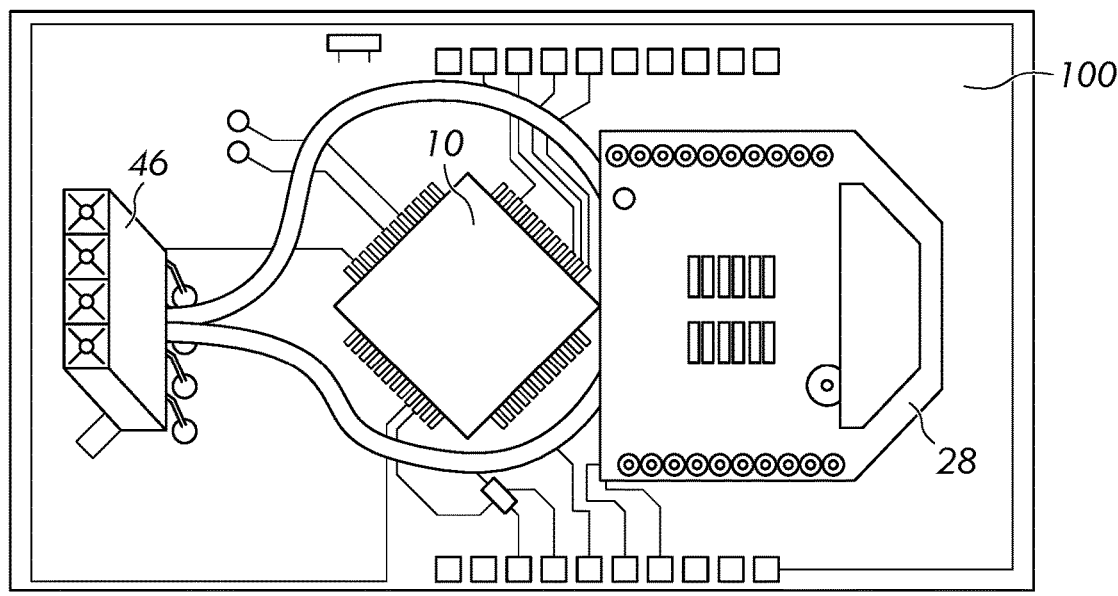
FIG. 11 is a schematic front view of an alternate embodiment of a first side of a second PCB of the material tracking system, according to an embodiment of this disclosure.

FIG. 11 shows an alternate embodiment of a second side 100 of the second PCB and includes, among other components, a second controller 10, a connector 46, and a communication module 28. In a preferred embodiment, the communication module 28 is wireless (e.g., Bluetooth, BTLE, Kirkland, Wash.). In some embodiments, the second PCB is coupled to a first PCB via the connector 46. In some embodiments, the second controller 10, among other operations, receives signals from the first controller of a first PCB, performs the material tracking operations described above, operates the user interface 24 and indicators 26, and transmits information to other components wirelessly via the communication module 28. In some embodiments, the second PCB is removably affixed to a reel box by a user after a reel is installed in the reel box. Means for affixing the second PCB can include any common means such as screws, nails, hook and loop connectors, wire, etc. In some embodiments, the second PCB is reusable and is used with multiple first PCBs.

Figure 12:
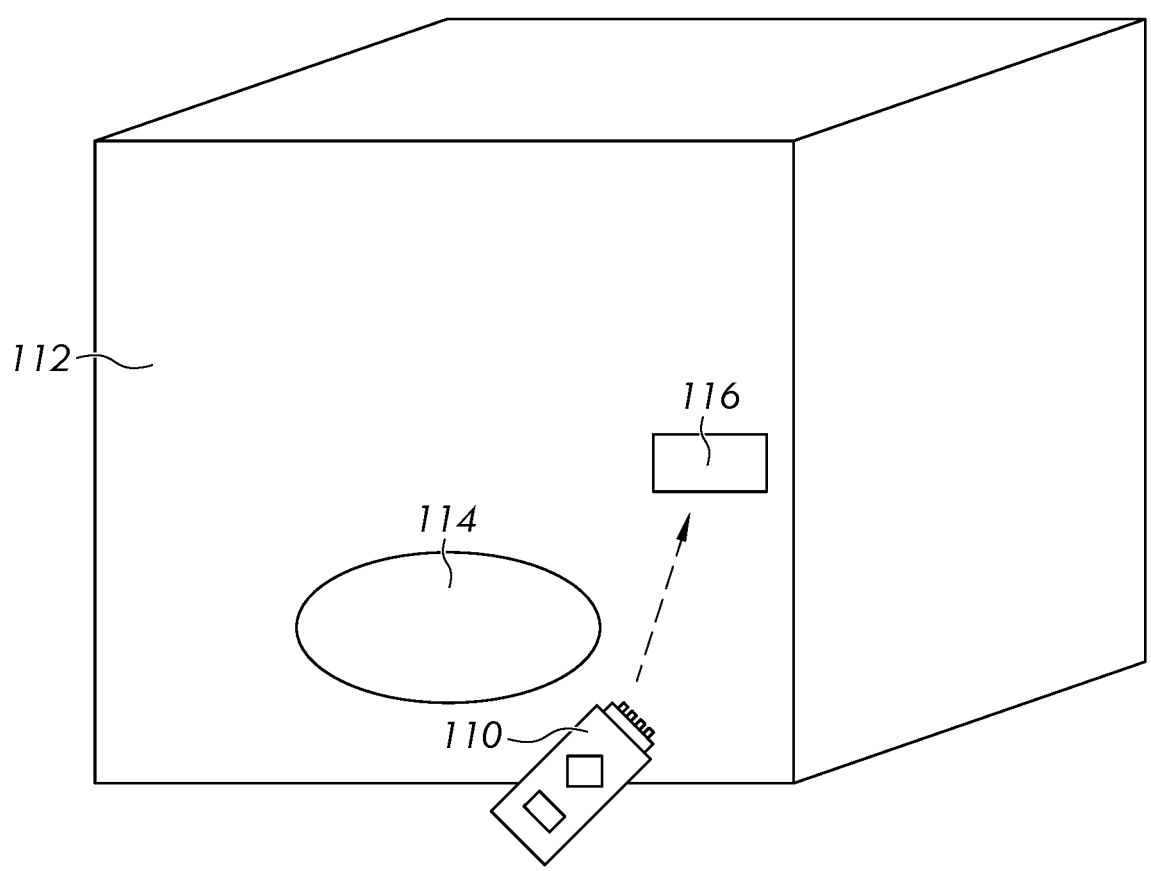
FIG. 12 is a diagram view of a reel box containing a reel and measurement sub-system, according to an embodiment of this disclosure.

As illustrated in FIG. 12, in some embodiments, a second PCB 110 is coupled to a reel box 112 that contains, among other components, a reel (not shown). In some embodiments, the second PCB 110 is coupled to the reel or reel box 112 during packaging of the material on the reel. In a preferred embodiment, the second PCB is removable from the reel box 112 and is used with multiple first PCBs. In some embodiments, the second PCB is disposable. An opening 114 for the material to be removed from the reel box 110 is shown. A slot 116 for the removable second PCB to be connected to the first PCB (not shown) for up- and down-loading of information is shown. The slot 116 is oriented with the reel box 112 so that the connectors of the first PCB and second PCB 110 may align.

By way of example, according to an embodiment enabled by this disclosure, a first PCB containing magnetic sensors is affixed at a distance of 6 inches from the central axis of a first end cap that is sized for a reel of wire (Cat 5 Plenum, Anixter, Glenview, Ill.). The first and second end cap are placed on the reel. A sensor, such as an accelerometer or magnetic detection element (#8 Screw Neodymium magnet, Applied Magnets, Plano, Tex.) is attached to a flange of the reel opposite from the first end cap. The reel is placed in a reel box and shipped to a user. The user may program a second PCB with the input identifier by a laptop computer which sends the information wirelessly to the transceiver in the second PCB. The user then attaches the second PCB to the outside of the reel box. As the user retrieves wire from the reel box, the reel rotates and the sensors of the first PCB detect the rotation of the detection element. The sensors send a signal to the second PCB with the number of rotations which can be a whole number or a fractional number. The sensor also detects, tracks, and transmits reverse rotations as wire is replaced or unused wire is rewound. The second PCB may be loaded with software which performs the calculations as described above using either Equation 1 for forward rotation (use of wire) or Equation 2 for reverse rotation (respooling or reloading). The second PCB may then send a signal containing the current amount of wire to the laptop computer for material tracking purposes.

In an alternate example, a first PCB containing optical sensors is affixed at a distance of 1 foot from the central axis of a first end cap that is sized for a reel of wire (18-02 OAS, Lake Cable 529 Thomas Drive Bensenville, Ill.). The first and second end cap are placed on the reel. An optical detection element (Light to digital converter, AMS, Styria Austria) is placed on a flange of the reel opposite from the first end cap. This is repeated for multiple reels of wire. The reels are shipped to a user. The user programs a second PCB with the input identifier of each reel with a smart phone. The smart phone sends the information to a wireless transceiver in the first PCB. As the user retrieves wire from the reel box, the reel rotates and the sensors of the first PCB detect the rotation of the detection element. The sensors send a signal to the smart phone with the input identifier and the number of rotations which can be a whole number or a fractional number. The sensor also detects, tracks, and transmits reverse rotations as wire is replaced or unused wire is rewound.

Figure 13:
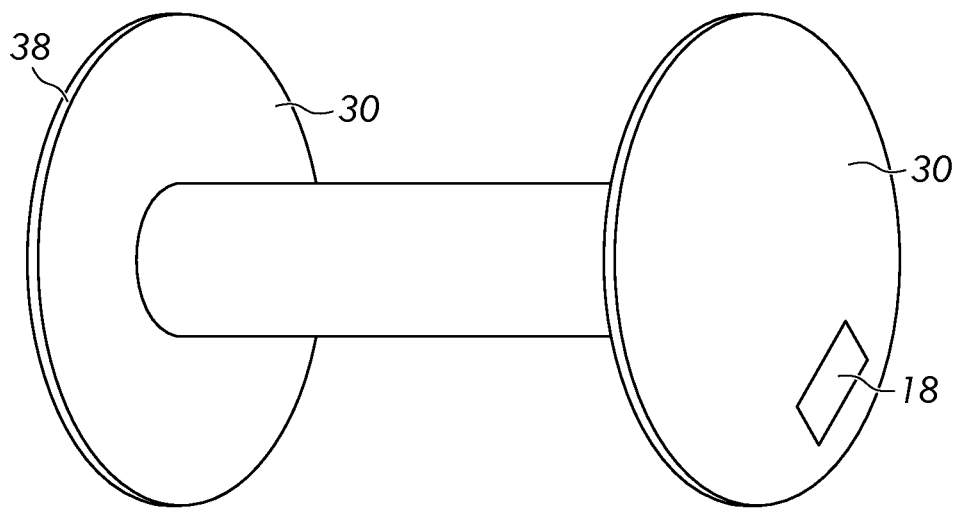
FIG. 13 is a perspective view of a reel in association with a measurement sub-system including a plate module in a first position, according to an embodiment of this disclosure.
Figure 14:
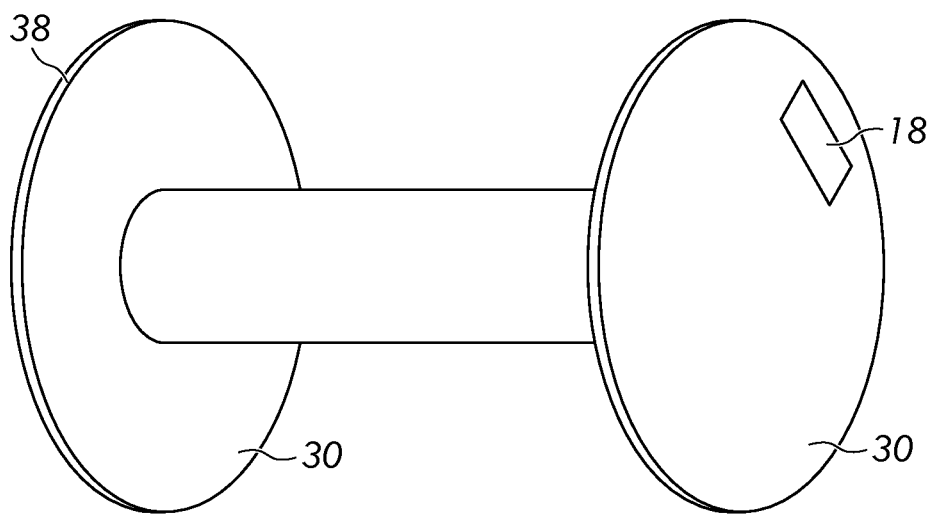
FIG. 14 is a perspective view of a reel in association with a measurement sub-system including a plate module in a second position, according to an embodiment of this disclosure.

Now turning to FIGS. 13-14, and additional embodiment will be described without limitation. FIGS. 13-14 show a common configuration of a reel 30 with one or more attached sensors 18, for example, attached to flanges 38. In this embodiment, an end cap can be removable or integrated permanently into the reel 30. The sensor 18 may include an accelerometer or other device capable of detecting an angular orientation. The sensor 18 may be operatively connected to a battery-powered sub-system 100, such as the version illustrated in FIG. 1. In one example, the sensor 18 may be communicatively connected to the battery-powered sub-system 100 wirelessly, without limitation. Since the position of the reel may be determined from the angular orientation of the sensor, this embodiment may advantageously remove the need for separate detection elements 20 as described along with other embodiments.

Referring now to FIG. 13, the reel 30 illustrates the sensor 18 installed to a reel flange 38. In one embodiment, the sensor may be provided by a sensor module attached to a plate module installed to the reel. The sensor may indicate an angular orientation, which may represent a starting state for determination of a number of rotations of the reel 30. As the reel 30 is rotated, the sensor may be repositioned along the X and/or Y axis in respect to a Z axis about which the reel 30 may be rotated. In one embodiment, the sensor 18 may measure changes in angular orientation about a single X or Y axis In another embodiment, the sensor 18 may measure changes in angular orientation about both the X and Y axis substantially simultaneously, which may provide a vector value. As the reel 30 is rotated, for example, as material included by the reel 30 is paid out, the location of the sensor 18 will change, which will change the angular orientation of the sensor 18 with respect to the rotational Z axis of the reel 30. For example, an initial location of the sensor 18 may be a location such as shown in FIG. 13 and the subsequent location of the sensor 18 may be a location such as shown in FIG. 14.

The frequency at which the sensor 18 may determine angular orientation may be set for a given application, precision, and desired quantity of data produced. In one example, provided without limitation, an accelerometer included in a sensor 18 may determine angular orientation at a rate of 40 Hz. Sensor data may be included in local storage and may processed locally to determine rotations and total amounts paid out. This initial processing being performed locally may advantageously reduce the amount of data having to be transmitted from local memory to global memory. For example, local processing may reduce 40 Hz of sensed raw angular orientation data to 1 Hz of processed data indicative of material paid out, rotational direction, material remaining on the reel, and/or other information. This embodiment may additionally reduce the need for a large local memory, for example and without limitation, to quantities around 4 megabytes, advantageously reducing the cost of materials to produce a system enabled by this embodiment. Alternatively, the raw data read by the sensor 18 may be transmitted to global memory for remote processing and analytics.

Data may be communicated via transceiver, for example, via Wi-Fi, 4G, 5G, cellular data, or networking protocols that would be appreciated by those of skill in the art. In some embodiments, a gateway may be provided to bridge communication protocols between a global network, such as an intranet and/or internet, and a local wireless network between the gateway and the sensor 18.

In this embodiment, the sensor 18 may report its angular orientation for a given positional location, which may indicate a change from a previously reported angular orientation. The change in angular orientation may be analyzed to determine a rate of change, direction of change, number of rotations, and other information relating to the winding or paying out of material included by the reel 30. A location receiver may be included with the sensor to determine a geographic position of the reel 30 to assist with determining whether material is being paid out or whether the reel is simply being rolled for transportation or relocation. The location receiver may use GPS, cellular triangulation, MM waves, ultrawideband tracking, and other location determining techniques to determine a location of a spool or reel. The reading of values from the sensor 18 may additionally be selectable between on and off states manually and/or dynamically from an operator and/or controller.

By including an accelerometer in the sensor, this embodiment advantageously removes the need for additional sensors to be included in a box housing the reel. The sensor may include features to assist with identification, for example, RFID, near-field communication (NFC), Bluetooth, and/or other protocols that would be appreciated by those of skill in the art. For example, the unique identification number may be communicated via one or more of the above features to assist with identification of a reel. Wireless data may be transmitted from the device including the sensor via transceiver and/or radio, which may include and/or interface with an antenna, for example, a PCB antenna, chip antenna, external antenna, and/or another antenna.

In an embodiment, a processing unit 16 on a smart phone (or other portable computing device) may be loaded with an application which performs the calculations as described above using Equation 1 for forward rotation (use of wire), or Equation 2 for reverse rotation (respooling or reloading), and/or another equation. The smart phone application may further provide a spreadsheet on the smart phone screen containing the current amount of wire for each reel by using the unique identification number stored in the memory associated with each reel. This information may then be uploaded at a preferred interval (e.g., per-second, per-minute, hourly, daily, weekly, monthly) to software on a desktop computer in the user's inventory control office.

The basic information regarding the amount of material, time/date, location, and/or other information obtained from the battery-powered measurement sub-system 100 may be manipulated by the processing unit 16 to determine a variety of potentially useful management metrics. For example, the data may easily be mathematically and logically organized and reorganized to determine: (a) the date and time of each pull; (b) location of each pull; (c) accurate billing based on time and materials actually expended at a specific job; (d) reducing overhead and minimizing wasted materials; and (e) maximize installer efficiency. Information may be sharable or saleable to distributors, manufacturers, and other parties to increase efficiencies and better anticipate market demands.

The processing of data may be adjusted to increase accuracy of the calculations, which may be performed locally and/or over a networked computing device. Feedback may be provided to the system regarding calculated payout rates, actual material paid out, margins of error, conditions of the payout, and other factors to improve the accuracy of the system. Calculations may be manipulated through the introduction and alteration of correction factors. For the purpose of this disclosure, a correction factor is intended to include constants, variables, scalar values, calibrations, formulae, and other mathematical operations to manipulate the calculations performed on sensed data to determine usable values and information. For example, a correction factor may be applied to account for the width of cable on a reel, whether the cable is a single conductor, tightness of spooling, respooled material, and other factors.

The feedback may be substantially automatically calculated through use of the system, manually entered, dynamically learned, and/or otherwise received. In one embodiment, a machine learning approach may be used to adjust correction factors based on iterations between multiple operations. For example, machine learning can be used to determine a proposed correction factor, check whether the correction factor improved accuracy of the calculation, and adjust the predictive weight of using the correction factor based on the results. The machine learning operation may be initially based on a rule set. This iterative process can be substantially continually repeated, allowing refinement of the calculation accuracy. The feedback may additionally be used with a fault tree, which may use data science to learn and improve initialization for various operating conditions. Sensors may be associated with information regarding material on a reel to further increase the likelihood of choosing proper correction factors and other variables associated with the material to improve accuracy.

In particular, the system allows an installer, his supervisor, supply ordering clerks to see the length wire remaining in each reel, spool, box, and/or other material-holding apparatus on site and at the office. For an installer on-site, the information means substantially limiting wasted labor time guessing whether a spool will make it to the end of the run; or risking a time exhausting repull. On the other hand, a supervisor would be able to see how many feet of cable have been installed versus the amount of cable use projected for a given job.

In one embodiment, the interface and operations performed by the processor may be updatable. For example, electronic components relating to the sensor and sub-system may be updated via firmware flashing, register editing, configuration files, over-the-air updates, security updates, and other manipulation of data that could affect operation. The sensor and/or additional components may include one or more expansion ports, which may provide additional functionality through supplemental hardware. Solder contacts may additionally be provided for the installation of hardware, for example, a radio or antenna.

Scrapping cable is leakage that most utilities and installers just deal with right now because of the labor cost to sort it out. A tool and system enabled by this disclosure can advantageously and substantially seamlessly provide actionable inventory data that allows users to use a large portion of their cable efficiently. In view of the functionality of the present system, the remaining inventory after a job is complete may be put into 'My Random Lengths Inventory' these random lengths will be easily searchable for use at future job sites.

Additionally, reels may be selected such that an amount remaining after a job is a usable quantity that can be used on a future job. Trends may be determined to assist with efficiently ordering cable and wire quantities most likely to be use substantially completely. For example, historic data on how much cable was pulled at which location on which day may be used to assist in spotting trends related to issues with job types or indicate which installers are most efficient.

The enclosure will now be discussed in greater detail. In one embodiment, at least part of the sub-system 100 may be included in an enclosure. The enclosure may include seals, liners, and/or other features to minimize or prevent the introduction of moisture, dirt, and dust into an interior volume encompassed by the enclosure. The enclosure may be made of various materials, including plastics, metals, wood, and other materials that will be appreciated by skilled artisans. The enclosure may be configured such that it may be installed in a substantially flush orientation with the reel and/or reel flange. The enclosure may include an antenna operatively connectable to a radio or transceiver. The sensor may include an expansion port, which may be accessible by the enclosure.

Figure 15:
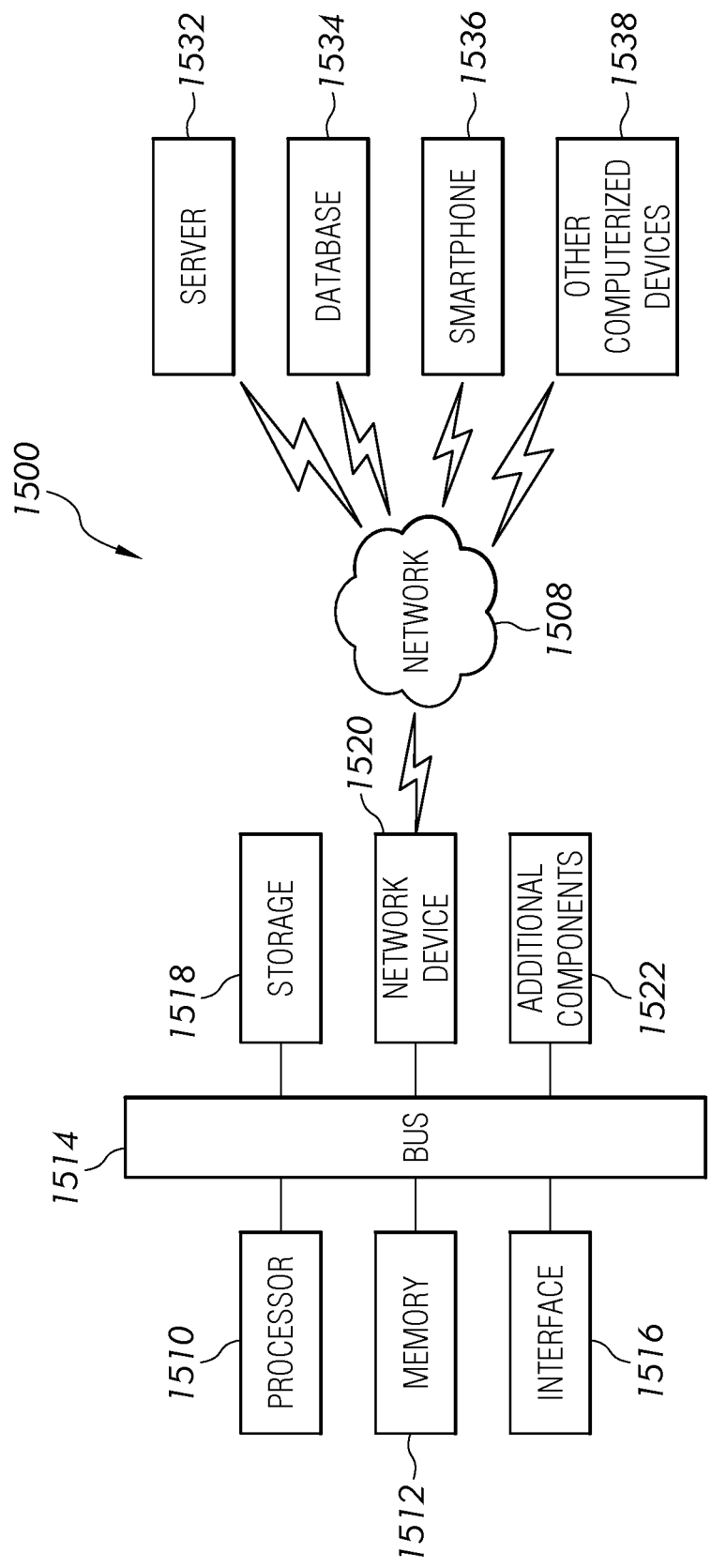
FIG. 15 is a block diagram view of a computerized device upon which aspects of this disclosure may be operated, according to an embodiment of this disclosure.

Referring now to FIG. 15, an illustrative computerized device will be discussed, without limitation. Various aspects and functions described in accord with the present disclosure may be implemented as hardware or software on one or more illustrative computerized devices 1500 or other computerized devices. There are many examples of illustrative computerized devices 1500 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 1500 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 1500, among others. Additionally, aspects in accord with the present disclosure may be located on a single illustrative computerized device 1500 or may be distributed among one or more illustrative computerized devices 1500 connected to one or more communication networks.

For example, various aspects and functions may be distributed among one or more illustrative computerized devices 1500 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 15 shows a block diagram of an illustrative computerized device 1500, in which various aspects and functions in accord with the present disclosure may be practiced. The illustrative computerized device 1500 may include one or more illustrative computerized devices 1500. The illustrative computerized devices 1500 included by the illustrative computerized device may be interconnected by, and may exchange data through, a communication network 1508. Data may be communicated via the illustrative computerized device using a wireless and/or wired network connection.

Network 1508 may include any communication network through which illustrative computerized devices 1500 may exchange data. To exchange data via network 1508, systems and/or components of the illustrative computerized device 1500 and the network 1508 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 1500 may transmit data via the network 1508 using a variety of security measures including TSL, SSL, or VPN, among other security techniques. The illustrative computerized device 1500 may include any number of illustrative computerized devices 1500 and/or components, which may be networked using virtually any medium and communication protocol or combination of protocols.

Various aspects and functions in accord with the present disclosure may be implemented as specialized hardware or software executing in one or more illustrative computerized devices 1500, including an illustrative computerized device 1500 shown in FIG. 15. As depicted, the illustrative computerized device 1500 may include a processor 1510, memory 1512, a bus 1514 or other internal communication system, an input/output (I/O) interface 1516, a storage system 1518, and/or a network communication device 1520. Additional devices 1522 may be selectively connected to the computerized device via the bus 1514. Processor 1510, which may include one or more microprocessors or other types of controllers, can perform a series of instructions that result in manipulated data. Processor 1510 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 1510 may be connected to other system elements, including a memory 1512, by bus 1514.

The illustrative computerized device 1500 may also include a network communication device 1520. The network communication device 1520 may receive data from other components of the computerized device to be communicated with servers 1532, databases 1534, smart phones 1536, and/or other computerized devices 1538 via network 1508. The communication of data may optionally be performed wirelessly. More specifically, without limitation, the network communication device 1520 may communicate and relay information from one or more components of the illustrative computerized device 1500, or other devices and/or components connected to the computerized device 1500, to additional connected devices 1532, 1534, 1536, and/or 1538. Connected devices are intended to include, without limitation, data servers, additional computerized devices, mobile computing devices, smart phones, tablet computers, and other electronic devices that may communicate digitally with another device. In one example, the illustrative computerized device 1500 may be used as a server to analyze and communicate data between connected devices.

The illustrative computerized device 1500 may communicate with one or more connected devices via communications network 1508. The computerized device 1500 may communicate over the network 1508 by using its network communication device 1520. More specifically, the network communication device 1520 of the computerized device 1500 may communicate with the network communication devices or network controllers of the connected devices. The network 1508 may be, for example, the internet. As another example, the network 1508 may be a WLAN. However, skilled artisans will appreciate additional networks to be included within the scope of this disclosure, such as intranets, local area networks, wide area networks, peer-to-peer networks, and various other network formats. Additionally, the illustrative computerized device 1500 and/or connected devices 1532, 1534, 1536, and/or 1538 may communicate over the network 1508 via wired, wireless, or other connection, without limitation.

Memory 1512 may be used for storing programs and/or data during operation of the illustrative computerized device 1500. Thus, memory 1512 may be a relatively high performance, volatile, random access memory such as a dynamic random-access memory (DRAM) or static memory (SRAM). However, memory 1512 may include any device for storing data, such as a disk drive or other non-volatile storage device. Various embodiments in accord with the present disclosure can organize memory 1512 into particularized and, in some cases, unique structures to perform the aspects and functions of this disclosure.

Components of illustrative computerized device 1500 may be coupled by an interconnection element such as bus 1514. Bus 1514 may include one or more physical busses (for example, busses between components that are integrated within a same machine) but may include any communication coupling between system elements including specialized or standard computing bus technologies such as USB, Thunderbolt, SATA, FireWire, IDE, SCSI, PCI, and InfiniBand. Thus, bus 1514 may enable communications (for example, data and instructions) to be exchanged between system components of the illustrative computerized device 1500.

The illustrative computerized device 1500 also may include one or more interface devices 1516 such as input devices, output devices and combination input/output devices. Interface devices 1516 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 1516 allow the illustrative computerized device 1500 to exchange information and communicate with external entities, such as users and other systems.

Storage system 1518 may include a computer readable and writeable nonvolatile storage medium in which instructions can be stored that define a program to be executed by the processor. Storage system 1518 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk, or flash memory, among others. In operation, processor 1510 or some other controller may cause data to be read from the nonvolatile recording medium into another memory, such as the memory 1512, that allows for faster access to the information by the processor than does the storage medium included in the storage system 1518. The memory may be located in storage system 1518 or in memory 1512. Processor 1510 may manipulate the data within memory 1512, and then copy the data to the medium associated with the storage system 1518 after processing is completed. A variety of components may manage data movement between the medium and integrated circuit memory element and does not limit the disclosure. Further, the disclosure is not limited to a particular memory system or storage system.

Although the above-described illustrative computerized device is shown by way of example as one type of illustrative computerized device upon which various aspects and functions in accord with the present disclosure may be practiced, aspects of the disclosure are not limited to being implemented on the illustrative computerized device 1500 as shown in FIG. 15. Various aspects and functions in accord with the present disclosure may be practiced on one or more computers having components other than that shown in FIG. 15. For instance, the illustrative computerized device 1500 may include specially programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, IOS, MAC OS X, or other operating systems on the aforementioned processors and/or specialized computing devices running proprietary hardware and operating systems.

The illustrative computerized device 1500 may include an operating system that manages at least a portion of the hardware elements included in illustrative computerized device 1500. A processor or controller, such as processor 1510, may execute an operating system which may be, among others, an operating system, one of the above-mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together to define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic. NET, JavaScript, Perl, Ruby, Delphi/Object Pascal, Visual Basic, Objective-C, Swift, MATLAB, PL/SQL, Open Edge ABL, R, Fortran, or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, Javascript, or other format that, when viewed in a window of a browser program, render aspects of a graphical-user interface, or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In operation, a method may be provided for tracking material stored on and drawn from a reel using a modular system. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 16:
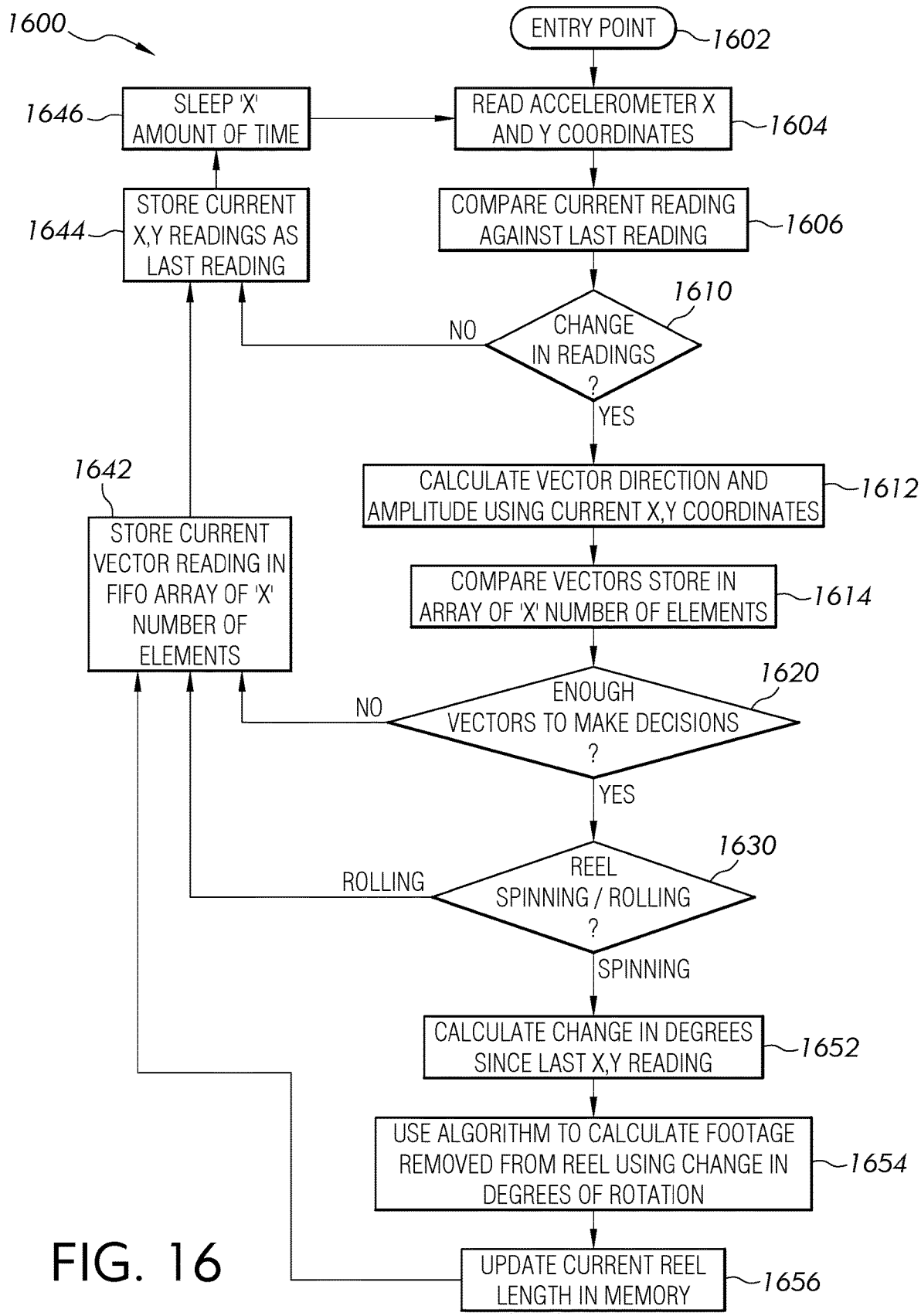
FIG. 16 is a flow chart view of an illustrative material sensing operation, according to an embodiment of this disclosure.
Figure 17:
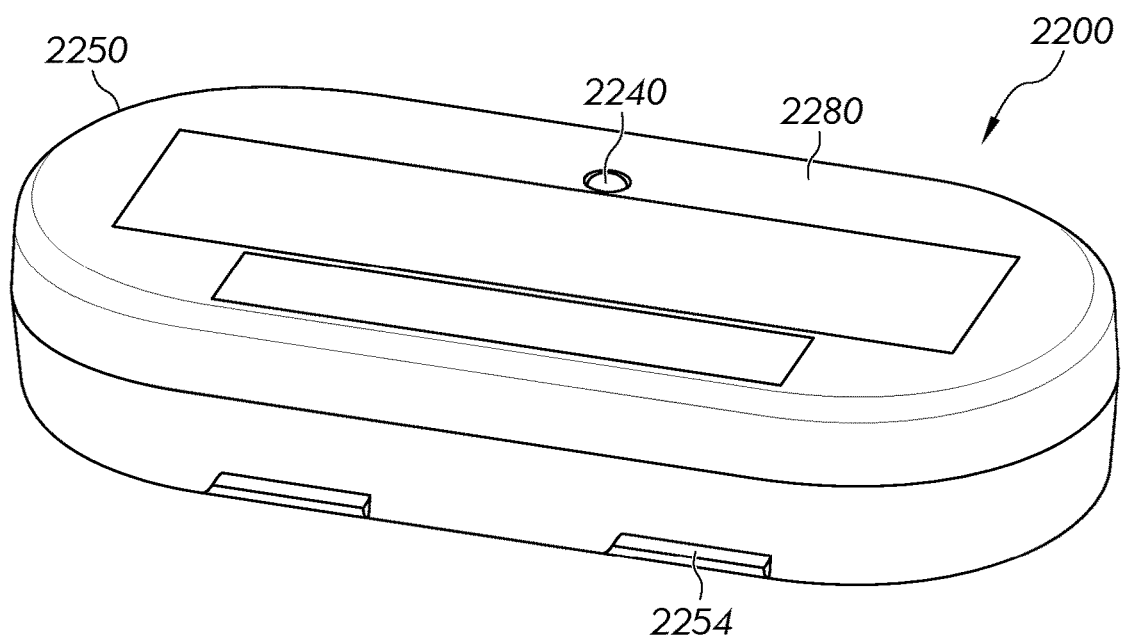
FIG. 17 is a perspective top view of a sensor module, according to an embodiment of this disclosure.
Figure 18:
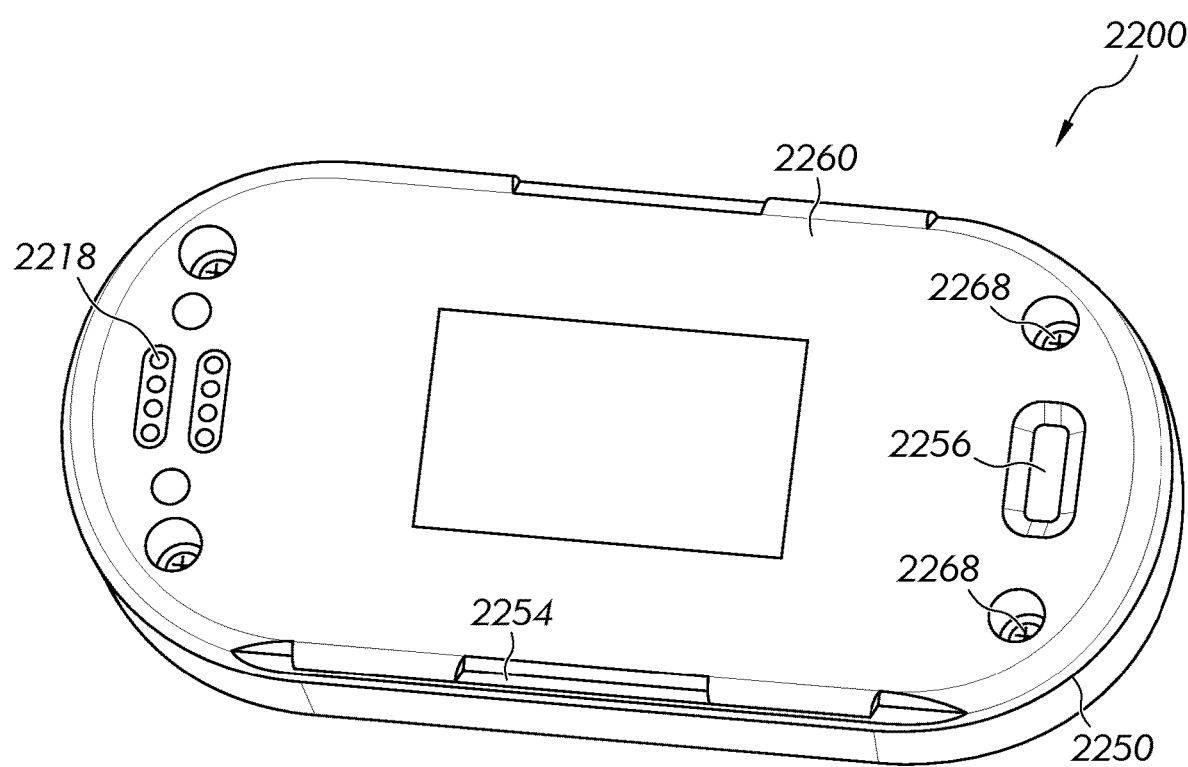
FIG. 18 is a perspective bottom view of a sensor module, according to an embodiment of this disclosure.
Figure 19:
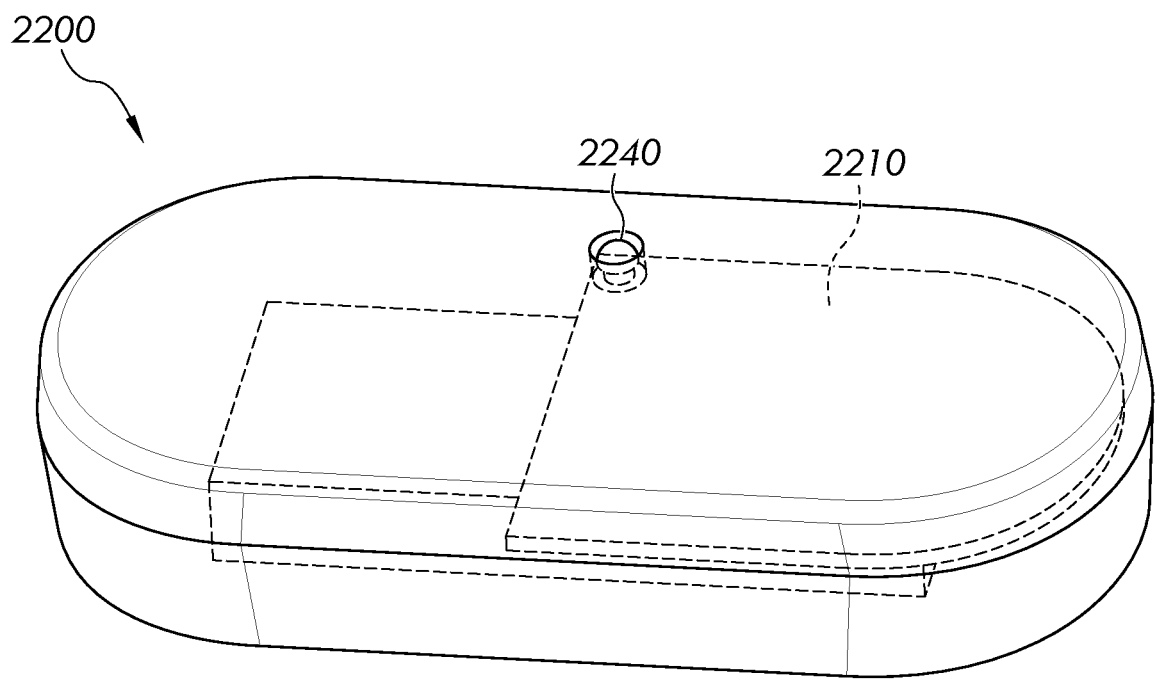
FIG. 19 is a perspective top view of sensor module internal components, according to an embodiment of this disclosure.
Figure 20:
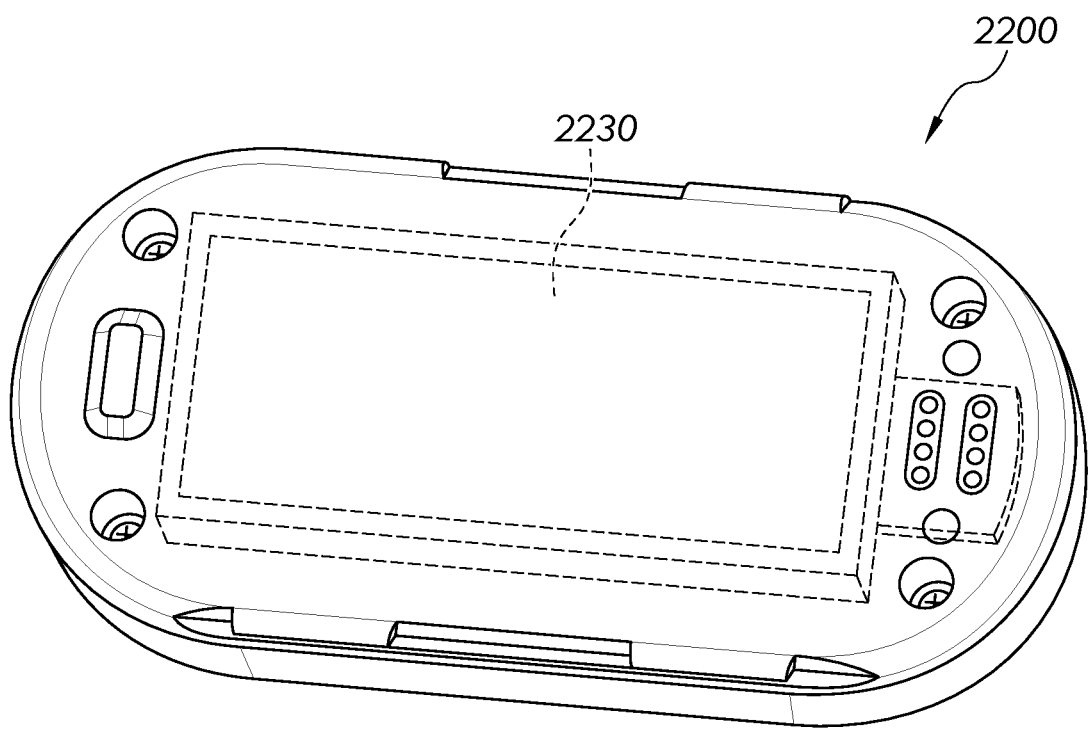
FIG. 20 is a perspective bottom view of sensor module internal components, according to an embodiment of this disclosure.
Figure 21:
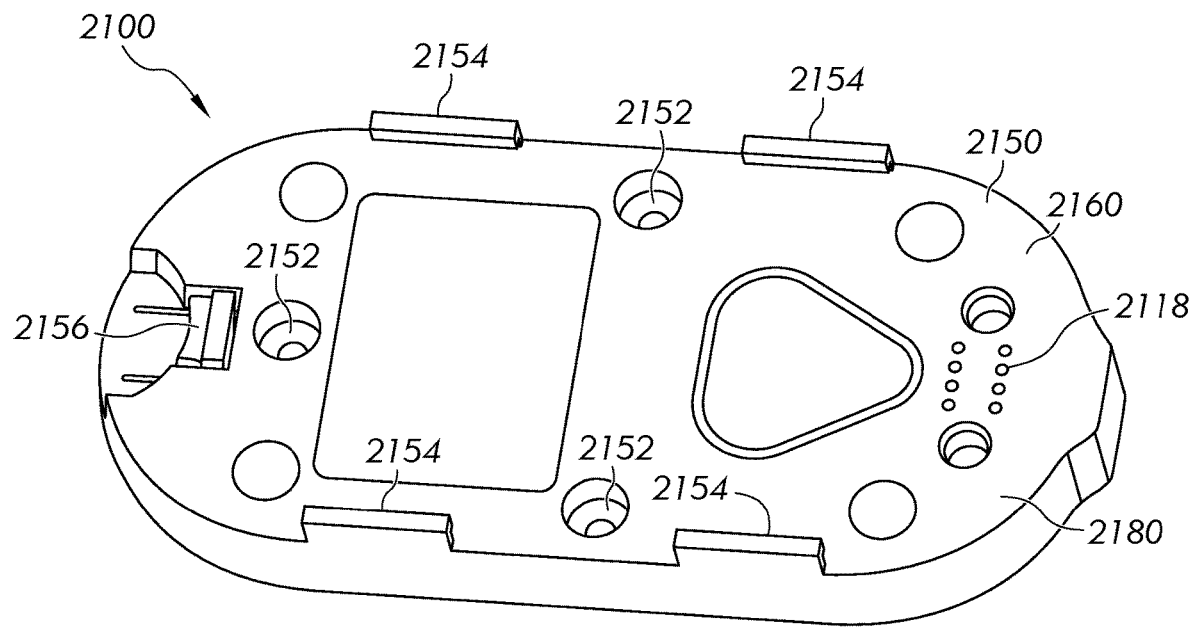
FIG. 21 is a perspective top view of a plate module, according to an embodiment of this disclosure.
Figure 22:
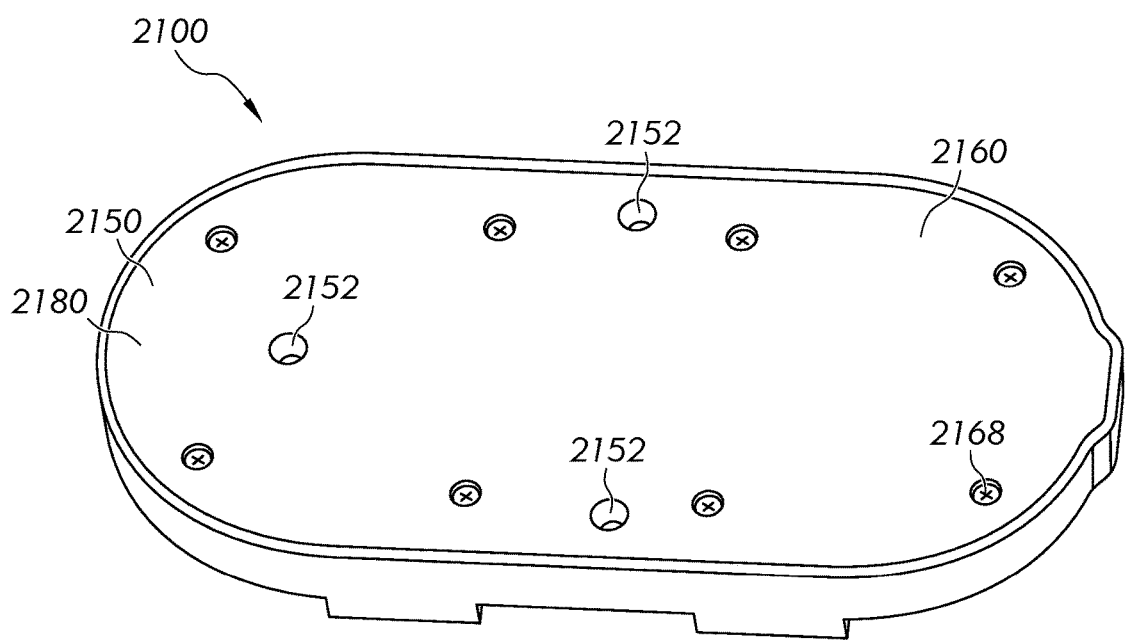
FIG. 22 is a perspective bottom view of a plate module, according to an embodiment of this disclosure.
Figure 23:
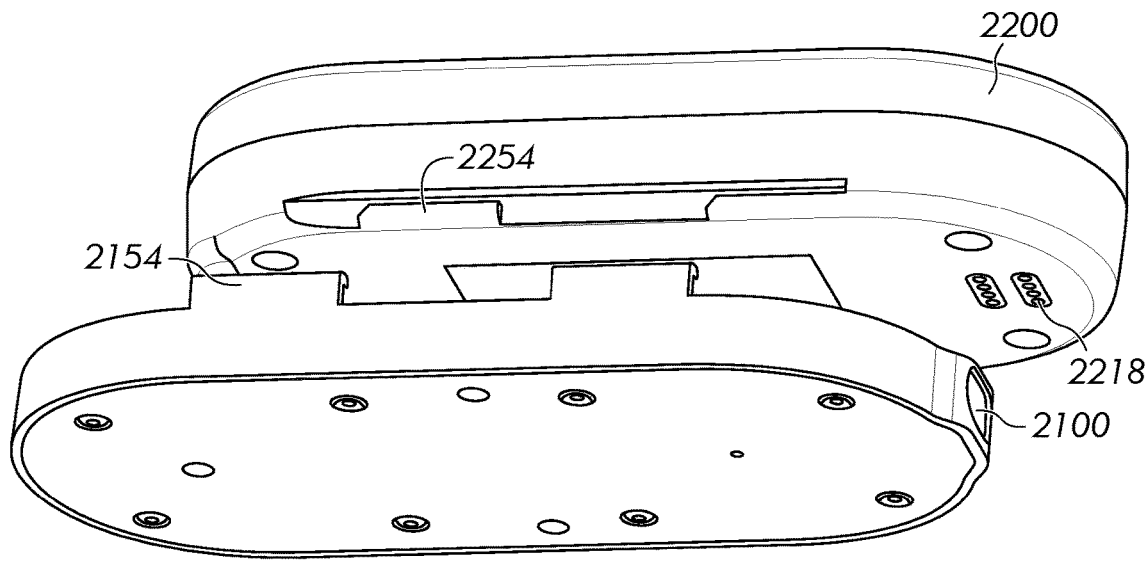
FIG. 23 is a perspective view of a sensor module and plate module, according to an embodiment of this disclosure.
Figure 24:
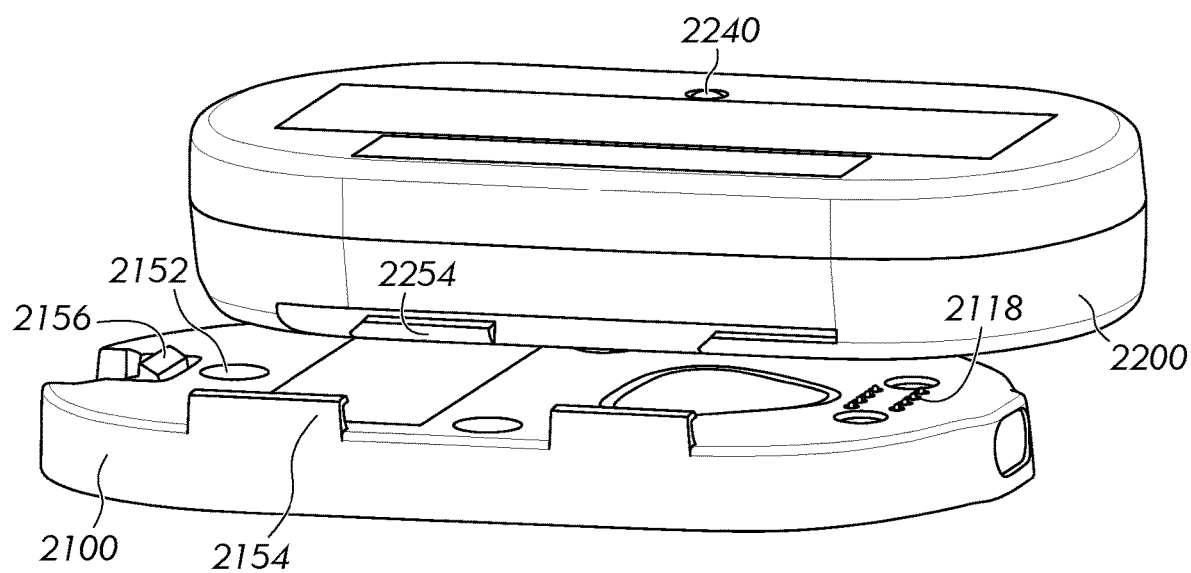
FIG. 24 is a perspective view of a sensor module and a plate module, according to an embodiment of this disclosure.
Figure 25:
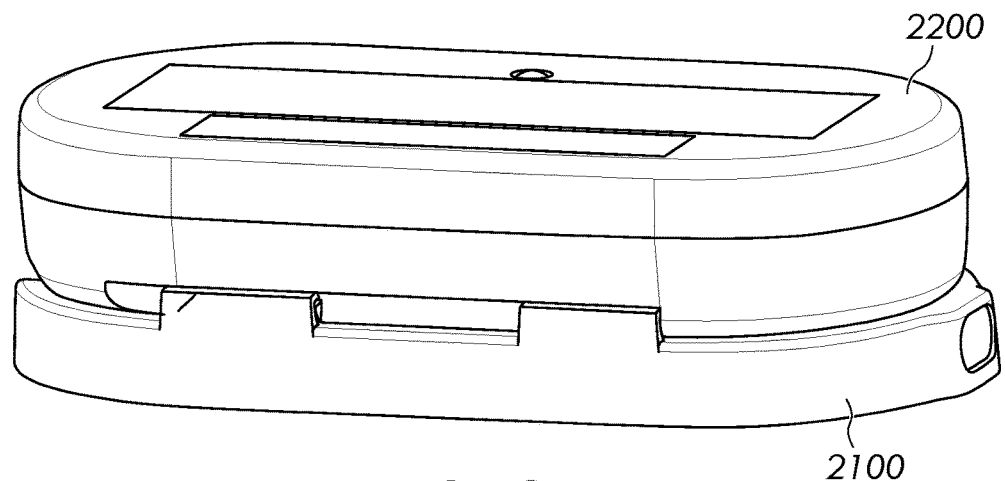
FIG. 25 is a perspective view of a sensor module installed to a plate module, according to an embodiment of this disclosure.
Figure 26:
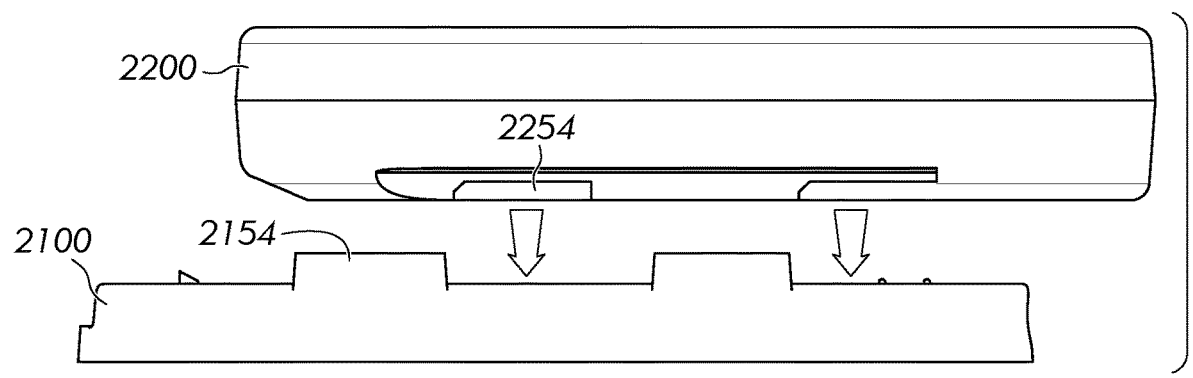
FIG. 26 is a side elevation view of a sensor module being removably installed to a plate module, according to an embodiment of this disclosure.
Figure 27:
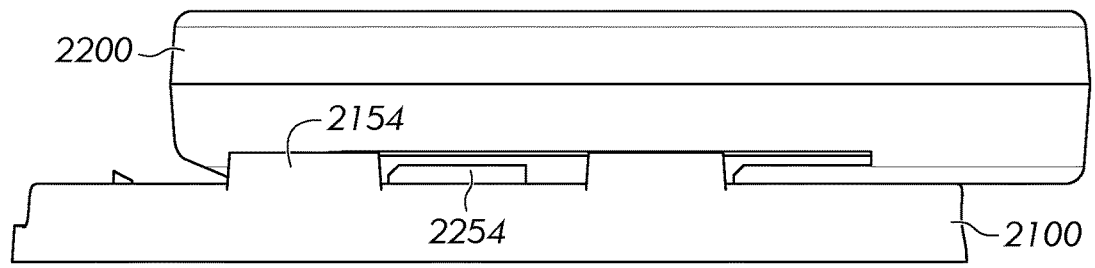
FIG. 27 is a side elevation view of a sensor module being removably installed to a plate module, according to an embodiment of this disclosure.

Referring now to flowchart 1600 of FIG. 16, an example method for an illustrative material sensing operation will be described, for example as may be performed by a sensor module, without limitation. Starting with Block 1602, the operation may begin by reading angular orientation values of a sensor including an accelerometer, which may include X and/or Y coordinates. (Block 1604). The angular orientation values may be compared with the last reading taken by the sensor. (Block 1606). It may then be determined at Block 1610 whether a significant change in readings is detected.

If a significant change in readings is not detected in the operation of Block 1610, the operation may proceed to store the current X and/or Y coordinates as the new last reading. (Block 1644). The operation may then sleep for a period. (Block 1646). The sleep period may be defined manually, adjusted dynamically, or be substantially automatically adjusted based on analyzing feedback. The operation may then return to Block 1064 and again read the values from the sensor.

If a significant change in readings is detected in the operation of Block 1610, the vector direction and amplitude may be determined using the X and/or Y coordinates. (Block 1612). The operation may then compare vectors stored in an array of multiple elements. (Block 1614). It may then be determined at Block 1620 whether enough vectors exist in the array to make a decision.

If insufficient vectors are determined to exist during the operation of Block 1620, the current vector may be stored in an array, such as a "first in, first out" (FIFO) array of multiple numbered elements. (Block 1642). The operation may then continue to Block 1644 to proceed as discussed above.

If sufficient vectors are determined to exist during the operation of Block 1620, it may then determine whether the reel is in a spinning or rolling state. (Block 1630). If it is determined at Block 1630 that the reel is in a rolling state, the operation may continue to Block 1642 to proceed as discussed above.

If it is determined at Block 1630 that the reel is spinning, the operation may calculate the change in angular orientation since the last X and/or Y reading. (Block 1652). An algorithm may then be used to calculate the length of material removed from the reel based on the change in angular orientation as the reel is spun. (Block 1654). The current reel length may then be stored to memory. (Block 1656). The operation may then continue to Block 1642 and proceed as discussed above.

In additional embodiments of this disclosure, features of the sensor device may be provided over multiple modules. FIGS. 17-27 illustrate aspects of these additional embodiments and should be considered along with the discussion provided throughout this disclosure. For example, features of the sensor device provided by this disclosure may be distributed between a sensor module and a plate module. And this embodiment, one that practices an invention enabled by this disclosure may advantageously reduce the amount of costly electronic components required for sensing and processing of sensed information to only a number of necessary sensor modules needed for an anticipated load of simultaneous jobs. A less expensive plate module may be installed to one or more reels or other objects to be tracked, allowing for receipt of the sensor module to enable the full scope of operability while tracking the removal of a material for a job.

The plate module will now be discussed in greater detail. FIGS. 21-27 highlight examples of the plate module, which may also be shown in other figures. The plate module 2100 may advantageously provide a relatively inexpensive device that may be installed to a reel and/or another object to be tracked. For example, the plate module 2100 may be installed to a reel using screws such that, while removal is not made impossible, the plate module 2100 is intended to remain with the reel for as long as it will be tracked, such as when material is paid off from the reel and while the reel is in storage. In at least one embodiment, the plate module 2100 may be installed to a reel, spool, or other location at virtually any point in the supply chain.

In an example where the plate module 2100 is installed to a reel of cable or material, the plate module may be installed at the point of manufacture of the reel, at the cable manufacturer that installs the cable to a reel, at a distributor that sells a reel, at a utility or other company that uses the reel, at the job site where material will be drawn from the reel, and/or at other steps along the supply chain. Data provided by and/or associated with a plate module may carry metadata and other information relating to the reel throughout the supply chain, which may be identifiable via a unique reel identification index provided by the plate module and associated with the reel. The reel identification index may be associated with a reel before the sensor module is added to the plate module. Metadata and other information may include, without limitation, length of cable, location, GPS coordinates, cable type, timestamp of last usage, duration of usage, and other information that would be appreciated by those of skill in the art after having the benefit of this disclosure.

The plate module 2100 may include plate module electronic components that may assist with identifying the reel onto which the plate module 2100 is attached. The plate module 2100 may additionally include a plate module docking interface 2154 to receive a sensor module 2200, which will be discussed in greater detail below.

A plate module 2100 may include plate module electronic components installed within a plate module enclosure 2150. The plate module electronic components may include various features to provide a reel identification index so that an operator may identify and track inventory and usage as it relates to each reel. For example, the plate module 2100 may include a printed serial number, RFID identification chip and antenna, QR code, NFC communication, passive electronic identification components, active electronic identification components, and/or other components that will be appreciated by a person of skill in the art after having the benefit of this disclosure.

In some embodiments, the plate module 2100 may additionally include a plate module controller and/or plate module processor, which may be operatively connected to plate module memory and/or a digital plate module storage medium. In one embodiment, the plate module may include a plate module battery that may deliver electrical power to one or more plate module electronic components, without limitation. In another embodiment, the plate module electronic components may be configured to operate substantially passively. In this passive configuration, the plate module electronic components may draw power from a connected device, such as a sensor module 2200 that may be connected to the plate module 2100. One or more of the plate module electronic components may or operate passively, for example such as with RFID identification features.

In an embodiment that includes a radio-frequency identification (RFID) feature, the plate module 2100 may include a RFID circuit and/or an RFID antenna. Those who are skilled in the art will appreciate RFID technology and the process through which RFID operates. In the interest of clearly describing an invention that may be enabled by this disclosure, an RFID feature may advantageously allow digital identification of a plate module 2100 when brought within sufficient proximity to an additional component, such as a sensor module 2200, a field-deployed scanner device, a computer application coupled with a RFID sensor, or other components, without limitation.

In an embodiment that includes a near-field communication (NFC) identification feature, the plate module 2100 may include an NFC circuit and/or an NFC antenna. Those who are skilled in the art will appreciate NFC technology and the process through which NFC operates. In the interest of clearly describing an invention that may be enabled by this disclosure, an NFC feature may advantageously allow digital identification of a plate module 2100 when brought within sufficient proximity to an additional component, such as a sensor module 2200, a field-deployed scanner device, a computer application coupled with a NFC sensor, or other components, without limitation.

The plate module electronic components included by the plate module 2100 may be integrated into a circuit board. For example, a circuit board provided by the plate module 2100 may include a plate module processor, plate module memory, plate module communication device, and/or other electronic features that would be appreciated by a person of skill in the art after having the benefit of this disclosure. In one embodiment, the circuit board may include electronics to provide power management, which may be operatively connected to a plate module battery, without limitation. In other embodiments, plate module power circuitry and/or a plate nodule battery may be omitted such that the plate module 2100 may operate substantially passively.

The plate module enclosure 2150 may include one or more features to facilitate installation to a reel and provide capacity to receive an additional component, such as a sensor module 2200. For example, the plate module enclosure 2150 may include a plate module enclosure member installation aperture 2152 to facilitate installation of the plate module 2100 to a reel or other object. For example, screws or other attachment hardware may be passed through the plate module enclosure member installation aperture 2152 to be received by the material of the reel or other object to which the plate module 2100 may be installed.

The plate module enclosure 2150 may additionally include a plate module docking interface 2154 to facilitate the removable installation of a sensor module 2200 or other device to the plate module 2100, as will be appreciated by a person of skill in the art after having the benefit of this disclosure. For example, the plate module docking interface 2154 may include one or more extensions of material to receive the sensor module 2200 or another component. The distal end of these extensions may include additional material such as to hold a corresponding channel provided by the sensor module 2200 when installed to the plate module 2100. In one embodiment, the plate module docking interface 2154 may be provided such that it may be received by a sensor module docking interface 2254, such as may be provided in a slide-and-lock docking operation illustrated in FIGS. 26-27.

The plate module enclosure 2150 may additionally include features to assist with maintaining the installation status of the sensor module 2200, for example, as may be provided by a plate module docking clip 2156. In this example, once a sensor module 2200 is installed to the plate module 2100, the sensor module 2200 may be held in place at least partially by the plate module docking clip 2156. To remove the sensor module 2200 from the plate module 2100, an operator may engage the plate module docking clip 2156 such that the sensor module 2200 may be removable from its docked position on the plate module 2100. Skilled artisans will appreciate additional locking mechanisms that may be included by the plate module 2100 and/or the sensor module 2200 after having the benefit of this disclosure, which are also intended to be included within the scope and spirit of this disclosure.

In one embodiment, the plate module enclosure 2150 may be provided in multiple members. For example, the plate module enclosure 2150 may be provided by a bottom plate module enclosure member 2160 and a top plate module enclosure member 2180. For example, the top plate module enclosure member 2180 may be installable to the bottom plate module enclosure member 2160 to provide a substantially unitary plate module enclosure 2150. An example of a plate module enclosure 2150 including multiple members will be discussed below without limitation.

The complete plate module enclosure 2150 may include a bottom plate module enclosure member 2160. In one example, the bottom plate module enclosure member 2160 may be constructed having a bottom plate module enclosure member body featuring material extending from a bottom plate module enclosure member outer surface to a bottom plate module enclosure member inner surface. One or more apertures may be provided as passing through the bottom plate module enclosure member body, for example to facilitate installation of the plate module 2100 to a reel, connection of the bottom plate module enclosure member 2160 to the top plate module enclosure member 2180, and/or other connections that would be appreciated by those of skill in the art after having the benefit of this disclosure.

For example, one or more plate module enclosure member installation apertures 2152 may be provided by the bottom plate module enclosure 2150 to facilitate installation of the plate module 2100 to a reel or other object. In this example, a screw or other attachment hardware may be passed through a plate module enclosure member installation aperture 2152 from the bottom plate module enclosure member inner surface, through the bottom plate module enclosure member body, and exiting the bottom plate module enclosure member outer surface to be received by the reel or an installation interface provided by the reel.

In another example, one or more bottom plate module enclosure member connection apertures 2168 may be provided by the bottom plate module enclosure member 2160 to facilitate installation of the bottom plate module enclosure member 2160 to the top plate module enclosure member 2180. In this example, the bottom plate module enclosure member connection apertures 2168 may be aligned with corresponding top plate module enclosure member connection receptacles. In this example, a screw or other hardware may be passed through the bottom plate module enclosure member connection aperture 2168 from a bottom plate module enclosure member outer surface, through the bottom plate module enclosure member body, and exiting the bottom plate module enclosure member inner surface such that it may be received by a top plate module enclosure member connection receptacle, without limitation.

The plate module enclosure 2150 may include a top plate module enclosure member 2180. In one example, the top plate module enclosure member 2180 may be constructed having a top plate module enclosure member body featuring material extending from a top plate module enclosure member outer surface to a top plate module enclosure member inner surface. One or more apertures may be provided passing through the top plate module enclosure member body, for example to facilitate installation of the plate module 2100 to a reel and/or other connections that would be appreciated by those of skill in the art after having the benefit of this disclosure. Additionally, one or more top plate module enclosure member connection receptacles may be provided to receive a screw or other hardware passed through the bottom plate module enclosure member connection aperture 2168, for example to facilitate connection of the bottom plate module enclosure member 2160 to the top plate module enclosure member 2180 and/or other connections that would be appreciated by those of skill in the art after having the benefit of this disclosure.

For example, one or more plate module enclosure member installation apertures 2152 may be provided by the top plate module enclosure 2150 to facilitate installation of the plate module 2100 to a reel or other object. In this example, a screw or other attachment hardware may be passed through a top plate module enclosure member installation aperture 2152 from the top plate module enclosure member outer surface, through the top plate module enclosure member body, exiting the top plate module enclosure member inner surface, and passing through the bottom plate module enclosure member 2160, to be received by the reel or an installation interface provided by the reel.

In another example, one or more top plate module enclosure member connection receptacles may be provided by the top plate module enclosure member 2180 to facilitate installation of the bottom plate module enclosure member 2160 to the top plate module enclosure member 2180. In this example, the bottom plate module enclosure member connection apertures 2168 may be aligned with corresponding top plate module enclosure member connection receptacles. In this example, a screw or other hardware may be passed through the bottom plate module enclosure member connection aperture 2168, such that it may be received by a top plate module enclosure member connection receptacle through the top plate module enclosure member outer surface, without limitation. Those of skill in the art will appreciate additional arrangements of connection apertures and connection receptacles, for example wherein the top plate module enclosure member 2180 include top plate module enclosure member 2180 connection apertures and the bottom plate module enclosure member includes bottom plate module enclosure member connection receptacles, without limitation.

The sensor module will now be discussed in greater detail. FIGS. 17-20 and 23-27 highlight examples of the sensor module, which may also be shown in other figures. The sensor module may include various electronic components to assist with the detection of an event, such as material being drawn from a real. For example, the sensor module may include a sensor, a sensor module processor, sensor module memory, radio frequency transmitter, sensor module battery, and/or other components that would be appreciated by a person of skill in the art after having the benefit of this disclosure. In one embodiment, the sensor module processor, sensor module memory, radio frequency transmitter, and/or other components may be included by a sensor module circuit board 2210, which may also be referred to as a sensor module PCB, without limitation.

When operated, the sensor module 2200 may assist with tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, and the material being wound about the reel core between the reel flanges. This and other information about the reel may be retrieved associated with a reel identification index, a plate module 2100, and/or another identifier. Information such as provided in the example above may be retrieved via a network, for example, by the sensor module 2200, from global memory included by a database, server, and/or other device that will be apparent to a person of skill in the art after having the benefit of this disclosure. The sensor module 2200 may be operatively connected to the plate module 2100, which is discussed in greater detail later in this disclosure.

In one embodiment, the sensor module 2200 may include a sensor to produce a signal indicative of rotation of the reel. The sensor included by the sensor module may be the sensor 18 discussed earlier in this disclosure, be analogous to sensor 18, or be otherwise provided as will be appreciated by those of skill in the art. For example, the sensor may detect an angular orientation in relationship to a reel onto which it is installed via being connected to a plate module 2100 installed to a reel. The sensor may count rotations of the reel to determine use via a change in the angular orientation sensed by the sensor. In some embodiments, the sensor may include an accelerometer, as discussed above along with the examples for the sensor 18. In additional embodiments, the sensor may detect additional conditions, for example, magnetic properties, motion, movement, position, time, use, and other characteristics. The sensor may be provided by a fusion sensor, which may include features of an accelerometer, gyrometer, gyroscope, magnetometer, and/or other sensors that would be apparent to a person of skill in the art after having the benefit of this disclosure.

The sensor module 2200 may include a controller or other computerized components. For example, the sensor module 2200 may include a sensor module processor operably receiving the signal from the sensor and counting cumulative rotations of the reel. Skilled artisans will appreciate that the sensor module processor may be the first processor 10 discussed earlier in this disclosure, analogous to same, or otherwise provided, without limitation. The sensor module may additionally include sensor module memory operably associated with the sensor module processor for storing memory contents comprising the cumulative rotations of the reel. Skilled artisans will appreciate that the sensor module memory may be the memory 14 discussed earlier in this disclosure or analogous to same.

The sensor module 2200 may include a radio frequency transmitter to communicate at least part of the sensor module memory contents, for example, via a network. Skilled artisans will appreciate that the sensor radio frequency transmitter may be analogous to the communication module 28 discussed earlier in this disclosure or analogous to same.

The sensor module 2200 may include an indicator 2240, which may provide a visual indication to a user regarding a status of the sensor module 2200, a reel associated with a plate module 2100, or another aspect of operation that would be appreciated by a person of skill in the art after having the benefit of this disclosure. In some embodiments, the indicator 2240 may be provided by, or be analogous to the indicator 26 described earlier in this disclosure. In various embodiments, the indicator 2400 may provide a visual indication via one or more of LEDs, e-ink displays, LCD panels, displays, monitors, text readouts, sound alerts, and otherwise as would be appreciated by those of skill in the art.

The sensor module 2200 may include a sensor module battery 2230 powering at least the sensor module processor, the sensor module memory, the sensor, and the radio frequency transmitter. Those of skill in the art will appreciate that the sensor module battery 2230 may be analogous to the battery discussed above and/or otherwise provided, without limitation. In some embodiments, the battery may be rechargeable. A USB or other charging connection may be provided by the sensor module 2200, plate module 2100, or otherwise to supply power to the electronic components and/or battery discussed throughout this disclosure.

The sensor module 2200 may additionally include sensor module power components to manage the charge and discharge of a battery and deliver electrical power to one or more of the components included by a system enabled by this disclosure. Those of skill in the art will appreciate that the sensor module power components may be the power supply module 22 discussed earlier in this disclosure or analogous to same.

The sensor module 2200 may include a sensor module enclosure 2250 that may include one or more features to facilitate installation to a reel, for example via removable installation to a plate module 2100. The sensor module enclosure 2250 may include a sensor module docking interface 2254 to facilitate the removable installation of the sensor module 2200 to the plate module 2100 or other device, as will be appreciated by a person of skill in the art after having the benefit of this disclosure. For example, the sensor module docking interface 2254 may include one or more channels or recesses of material to accept material from the plate module 2100 or another component. The recess of material may be configured to receive the distal end of extensions included by a plate module 2100 and may hold the sensor module 2200 to the plate module 2100 when installed to the plate module 2100. In one embodiment, the sensor module docking interface 2254 may be provided such that it may receive a sensor plate module docking interface 2154, such as may be provided in a slide-and-lock docking operation.

The sensor module enclosure 2250 may additionally include features to assist with maintaining the installation status of the sensor module 2200 to the plate module 2100, for example as may be provided by a sensor module docking clip receiver 2256. In this example, once a sensor module 2200 is installed to the plate module 2100, the sensor module 2200 may be held in place at least partially by the plate module docking clip 2156 engaging the sensor module docking clip receiver 2256. To remove the sensor module 2200 from the plate module 2200, an operator may engage the plate module docking clip 2156 to disengage from the sensor module docking clip receiver 2256 such that the sensor module 2200 may be removable from its docked position on the plate module 2100. Skilled artisans will appreciate additional locking mechanisms that may be included by the sensor module 2200 and/or the plate module 2100 after having the benefit of this disclosure, which are also intended to be included within the scope and spirit of this disclosure.

In one embodiment, the sensor module enclosure 2250 may be provided in multiple members. For example, the sensor module enclosure 2250 may be provided by a bottom sensor module enclosure member 2260 and a top sensor module enclosure member 2280. For example, the top sensor module enclosure member 2280 may be installable to the bottom sensor module enclosure member 2260 to provide a substantially unitary sensor module enclosure 2250. An example of a sensor module enclosure 2250 including multiple members will be discussed below without limitation.

The complete sensor module enclosure 2250 may include a bottom sensor module enclosure member 2260. In one example, the bottom sensor module enclosure member 2260 may be constructed having a bottom sensor module enclosure member body featuring material extending from a bottom sensor module enclosure member outer surface to a bottom sensor module enclosure member inner surface. One or more apertures may be provided passing through the bottom sensor module enclosure member body, for example to facilitate connection of the bottom sensor module enclosure member 2260 to the top sensor module enclosure member 2280, and/or other connections that would be appreciated by those of skill in the art after having the benefit of this disclosure.

For example, one or more bottom sensor module enclosure member connection apertures 2268 may be provided by the bottom sensor module enclosure member 2260 to facilitate installation of the bottom sensor module enclosure member 2260 to the top sensor module enclosure member 2280. In this example, the bottom sensor module enclosure member connection apertures 2268 may be aligned with corresponding top sensor module enclosure member connection receptacles 2268. In this example, a screw or other hardware may be passed through the bottom sensor module enclosure member connection aperture 2268 from a bottom sensor module enclosure member outer surface, through the bottom sensor module enclosure member body, and exiting the bottom sensor module enclosure member inner surface such that it may be received by a top sensor module enclosure member connection receptacle 2268, without limitation.

The sensor module enclosure 2250 may include a top sensor module enclosure member 2280. In one example, the top sensor module enclosure member 2280 may be constructed having a top sensor module enclosure member body featuring material extending from a top sensor module enclosure member outer surface to a top sensor module enclosure member inner surface. One or more top sensor module enclosure member connection receptacle may be provided to receive a screw or other hardware passed through the bottom sensor module enclosure member connection aperture 2268, for example to facilitate connection of the bottom sensor module enclosure member 2260 to the top sensor module enclosure member 2280 and/or other connections that would be appreciated by those of skill in the art after having the benefit of this disclosure.

In one example, one or more top sensor module enclosure member connection receptacle may be provided by the top sensor module enclosure member 2280 to facilitate installation of the bottom sensor module enclosure member 2260 to the top sensor module enclosure member 2280. In this example, the bottom sensor module enclosure member connection apertures 2268 may be aligned with corresponding top sensor module enclosure member connection receptacles.

In this example, a screw or other hardware may be passed through the bottom sensor module enclosure member connection aperture 2268, such that it may be received by a top sensor module enclosure member connection receptacle through the top sensor module enclosure member outer surface, without limitation. Those of skill in the art will appreciate additional arrangements of connection apertures and connection receptacles, for example wherein the top sensor module enclosure member 2280 include top sensor module enclosure member 2280 connection apertures and the bottom sensor module enclosure member 2260 includes bottom sensor module enclosure member connection receptacles, without limitation.

A docking interface may be provided to assist removably installing the sensor module 2200 to the plate module 2100. The docking interface may include a plate docking interface 2154 provided by the plate module 2100 and a sensor docking interface 2254 provided by the sensor module 2200. The sensor docking interface 2254 may be removably received by the plate docking interface 2154 to provide a docked physical connection. To remove the sensor module 2200 from the docked physical connection with the plate module 2100, the sensor module 2200 may be slid, lifted, removed, unclipped, or otherwise disconnected from the plate module 2100 to remove the sensor docking interface from the plate docking interface, without limitation.

The plate module 2100 and the sensor module 2200 may include aspects of an electronic interface to facilitate electronic communication by a physical connection, wireless connection, and/or otherwise. In some embodiments, electrical power may be supplied through at least part of the electronic interface, for example and without limitation, from the battery of the sensor module 2200 to the plate module 2100.

The electronic interface may include a plate module electronic interface and a sensor module electronic interface. When the sensor module 2200 is configured in the docked physical connection with the plate module 2100, the plate module electronic interface 2118 may align with the sensor module electronic interface 2218 to create a docked electronic connection, for example, by physical contact of conductors. In one embodiment, the electronic connection may be provided by engagement of pogo pins or other electrical contacts that would be appreciated by a person of skill in the art after having the benefit of this disclosure. When in the docked electronic connection, electronic signals may be selectively communicated via the electronic interface.

While docked, a reel identification index associated with a reel onto which the plate module 2100 is installed may be communicated from the plate module 2100 to the sensor module 2200 via the electronic interface. The sensor module 2200 may then use this reel identification index to retrieve information about the reel to initialize the analytic and material tracking operations. Information about a reel may be provided by the plate module 2100, data stored in memory by the sensor module 2200, retrieved from a network-connected database, or provided in another way that you be apparent to a person of skill in the art after having the benefit of this disclosure.

In one example, a sensor module 2200 may retrieve a length value for the length of the material included by the reel identified by the reel identification index. As material is drawn from the reel, the sensor module 2200 connected to the plate module 2100 and installed to the reel may determine the cumulative rotations of the reel occurring subsequent to retrieving the length value. The cumulative rotations may be determined as the difference between the number of forward rotations and the number of revers rotations, without limitation. The sensor module 2200 may analyze the cumulative rotations to determine the length of the material drawn from the reel. The sensor module 2200 may then update the length value identified by the reel identification index to reflect the length of the material remaining on the reel after at least part of the material is drawn from the reel.

This update may change and/or supplement values stored by the memory of the sensor module 2200, plate module 2100 (in embodiments wherein memory is included by the plate module), or in a network-connected database via the radio frequency transmitter. In one example, the sensor module may be connected to a server and/or database over a network. The server and/or database may provide a global memory accessible over the network via the radio frequency transmitter to communicate at least the reel identification index and the length value. Initial values and information regarding the reel may additionally be accessed and retrieved from the global memory. For example, length values associated with one or more corresponding reel may be stored by the global memory. The sensor module 2200 may be permitted to access and retrieve the length value from the global memory as associated with the reel identification index provided by the plate module 2100. After the draw of material from a reel occurs, length values and/or changes in length values may be updated in the global memory, such as provided by a network communication from the sensor module 2200. Length values stored by the global memory may be displayed to a user via an interface, such as my be provided on a computer, web browser, SaaS platform, application, or otherwise as would be appreciated by a person of skill in the art after having the benefit of this disclosure.

In one embodiment, the sensor module 2200 may further include a clock that outputs time values. The sensor module memory may store time series data relative to the cumulative rotations of the reel correlated with the time values. The sensor module 2200 may additionally include a sensor location receiver that outputs a geographic position. The sensor module 2200 may advantageously associate an event in which the material is drawn from the reel with the geographic position at which the material is drawn, providing additional resolution to users about the use of a system enabled by this disclosure. This information may be further interpreted to give useful information such as length of material drawn from a reel, the location at which material was drawn, the amount of material drawn at a location, time stamps, draw rates, and other information. By analyzing the information provided by a system enabled by this disclosure, a processor connected to the global memory may recommend a reel for an anticipated job having sufficient material available while minimizing waste that may be cause by leaving an unknown or unusable amount of material on the reel after a job is complete.

In some embodiments, the plate module may be sold or otherwise provided to customers as a stand-alone product. The plate module may be installed to a reel, spool, or other device without requiring a sensor to be attached at the time of installation, storage, movement, relocation, or other times. Essentially, in this embodiment, the plate module may be intended to remain with the reel as it holds material to be drawn from it. The sensor module may then be temporarily installed to the plate module while material is drawn from reel onto which the plate module is installed to gather data regarding the draw event and communicate such data to server to update a global inventory. The sensor module may then be removed from the plate module once the draw event is complete. These plate modules may include features to be read by sensor modules, sensor devices, readers, smartphone applications, or otherwise even if the sensor module is not attached. Such features may include RFID, QR codes, NFC, Bluetooth, and/or other communication protocols that would be appreciated by a person of skill in the art after having the benefit of this disclosure. Information that may be read from the plate module may assist with identifying the reel, the material remaining on the reel, properties of the material on the reel, location, last use, and other information that would be apparent to skilled artisans.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A system for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges, the system comprising:
   a plate module to be physically installed to the reel;
   a sensor module removably installed to the plate module comprising:
      a sensor to produce a signal indicative of rotation of the reel to be operatively received by a sensor module processor operable to count cumulative rotations of the reel, a sensor module memory operably associated with the sensor module processor for storing memory contents comprising the cumulative rotations of the reel, and a radio frequency transmitter to communicate at least part of the sensor module memory contents; and wherein a remaining length of the material wound on the reel is calculated based on at least the cumulative rotations of the reel.

2. The system of claim 1, further comprising:

a docking interface comprising:

a plate docking interface provided by the plate module, and a sensor docking interface provided by the sensor module;

wherein the sensor docking interface is removably received by the plate docking interface to provide a docked physical connection; and wherein the docked physical connection is selectively disengaged to remove the sensor module from the plate module.

3. The system of claim 2:

an electronic interface comprising:

a plate module electronic interface, and a sensor module electronic interface;

wherein the docked physical connection aligns the plate module electronic interface and the sensor module electronic interface to create a docked electronic connection; and wherein electronic signals are selectively communicated via the electronic interface in the docked electronic connection.

4. The system of claim 3:

wherein the sensor module comprises a sensor module battery powering at least the sensor module processor and the radio frequency transmitter; and wherein the plate module is at least partially powered by the sensor module battery.

5. The system of claim 3:

wherein the plate module comprises a reel identification index to identify the reel; and wherein the reel identification index is communicated from the plate module to the sensor module via the electronic interface.

6. The system of claim 5:

wherein the sensor module retrieves a length value for the length of the material included by the reel identified by the reel identification index;

wherein the sensor module determines the cumulative rotations of the reel occurring subsequent to retrieving the length value;

wherein the sensor module analyzes the cumulative rotations to determine the length of the material drawn from the reel; and wherein the sensor module updates the length value identified by the reel identification index to reflect the length of the material remaining on the reel after at least part of the material is drawn from the reel.

7. The system of claim 6, further comprising:

a global memory accessible over a network via the radio frequency transmitter to communicate at least the reel identification index and the length value;

wherein one or more length values associated with respectively one or more corresponding reels are stored by the global memory; and wherein at least part of the one or more length values stored by the global memory are displayed to a user via an interface.

8. The system of claim 1, wherein the sensor module further comprises:

a clock that outputs time values, the sensor module memory storing time series data indicative of the cumulative rotations of the reel correlated with the time values.

9. The system of claim 1, wherein the sensor module further comprises:

a sensor location receiver that outputs a geographic position;

wherein the sensor module associates an event in which the material is drawn from the reel with the geographic position at which the material is drawn;

wherein the sensor module stores the geographic position associated with the event in the sensor module memory.

10. The system of claim 1, wherein the sensor module further comprises:

a sensor location receiver that outputs a geographic position;

a clock that outputs time values, the sensor module memory storing time series data indicative of the cumulative rotations of the reel correlated with the time values;

wherein the sensor module associates the time series data indicative of an event in which the material is removed from the reel with the geographic position at which the event occurred;

wherein the sensor module processor further stores the time series data indicative of the geographic position associated with the event in the sensor module memory.

11. The system of claim 1, wherein the sensor detects an angular orientation.

12. The system of claim 11, wherein the rotations of the reel are determined using a change in the angular orientation sensed by the sensor.

13. The system of claim 1, wherein the sensor comprises an accelerometer.

14. A system for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges, the system comprising:

a plate module to be physically installed to the reel;

a sensor module removably installed to the plate module comprising:

a sensor to detect change in angular orientation and produce a signal indicative of rotation of the reel, a sensor module processor operably receiving the signal from the sensor and counting cumulative rotations of the reel, and a sensor module memory operably associated with the sensor module processor for storing memory contents comprising the cumulative rotations of the reel; and a docking interface comprising:

a plate docking interface provided by the plate module, a sensor docking interface provided by the sensor module, wherein the sensor docking interface is removably received by the plate docking interface to provide a docked physical connection, and wherein the docked physical connection is selectively disengaged to remove the sensor module from the plate module;
an electronic interface comprising:
a plate module electronic interface, and
a sensor module electronic interface,
wherein the docked physical connection aligns the plate module electronic interface and the sensor module electronic interface to create a docked electronic connection,
wherein electronic signals are selectively communicated via the electronic interface in the docked electronic connection, and
wherein a reel identification index that identifies the reel is selectively communicated from the plate module to the sensor module via the electronic interface;
wherein a remaining length of the material wound on the reel is calculated based on at least the cumulative rotations of the reel;
wherein the sensor module retrieves a length value for the length of the material included by the reel identified by the reel identification index;
wherein the sensor module determines the cumulative rotations of the reel occurring subsequent to retrieving the length value;
wherein the sensor module analyzes the cumulative rotations to determine the length of the material drawn from the reel; and
wherein the sensor module updates the length value identified by the reel identification index to reflect the length of the material remaining on the reel after at least part of the material is drawn from the reel.

15. The system of claim 14, further comprising:
a global memory accessible over a network via a radio frequency transmitter to communicate at least the reel identification index and the length value; and
wherein one or more length values associated with respectively one or more corresponding reels are stored by the global memory.

16. The system of claim 14, wherein the sensor module further comprises:
a clock that outputs time values, the sensor module memory storing time series data indicative of the cumulative rotations of the reel correlated with the time values.

17. The system of claim 14:
wherein the sensor module further comprises a sensor location receiver that outputs a geographic position;
wherein the sensor module associates an event in which the material is drawn from the reel with the geographic position at which the material is drawn; and
wherein the sensor module stores the geographic position associated with the event in the sensor module memory.

18. A method for tracking a length of a material wound on a reel, the material having a known starting length and a known thickness, the reel having a reel core of known width and known volume, the reel further having reel flanges physically connected to the reel at opposite ends of the reel core such that the reel flanges rotate with the reel core, the material being wound about the reel core between the reel flanges, the method comprising:
a) removably installing a sensor module to a plate module that is physically installed to the reel;
b) producing a signal indicative of rotation of the reel using a sensor included by the sensor module;
c) counting cumulative rotations of the reel via a sensor module processor using at least the signal;
d) storing memory contents comprising the cumulative rotations of the reel to a sensor module memory operably associated with the sensor module processor; and
e) calculating a remaining length of the material wound on the reel based on at least the cumulative rotations of the reel.

19. The method of claim 18, further comprising:
f) providing a docked physical connection via receiving a sensor docking interface of the sensor module by a plate docking interface of the plate module to provide the docked physical connection, wherein the docked physical connection is selectively disengaged to remove the sensor module from the plate module; and
g) aligning a plate module electronic interface of the plate module and a sensor module electronic interface of the sensor module to create an electronic interface, wherein electronic signals are selectively communicated via the electronic interface.

20. The method of claim 18, further comprising:
i) retrieving a length value via the sensor module for the length of the material included by the reel identified by a reel identification index assigned to the plate module installed to the reel;
i) determining via the sensor module the cumulative rotations of the reel occurring subsequent to retrieving the length value;
j) analyzing via the sensor module the cumulative rotations to determine the length of the material drawn from the reel; and
k) updating via the sensor module the length value identified by a reel identification index to reflect the length of the material remaining on the reel after at least part of the material is drawn from the reel.

\* \* \* \* \*